United States Patent
Walton et al.

(10) Patent No.: US 7,548,371 B2
(45) Date of Patent: Jun. 16, 2009

(54) OPTICAL FILM, ILLUMINATOR AND DISPLAY

(75) Inventors: Emma Jayne Walton, Oxford (GB); Allan Evans, Oxford (GB); Thomas Wynne-Powell, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 10 days.

(21) Appl. No.: 11/301,995

(22) Filed: Dec. 13, 2005

(65) Prior Publication Data
US 2007/0133094 A1    Jun. 14, 2007

(51) Int. Cl.
*G02B 5/02* (2006.01)
*G02B 13/20* (2006.01)

(52) U.S. Cl. ...................................... 359/599
(58) Field of Classification Search ............... 359/599
See application file for complete search history.

(56) References Cited

U.S. PATENT DOCUMENTS

| | | | |
|---|---|---|---|
| RE27,617 E | 4/1973 | Olsen | |
| 4,726,662 A | 2/1988 | Cromack | |
| 6,091,547 A | 7/2000 | Gardiner et al. | |
| 2003/0035231 A1 | 2/2003 | Epstein et al. | |
| 2005/0259198 A1* | 11/2005 | Lubart et al. ................. | 349/113 |

FOREIGN PATENT DOCUMENTS

| | | |
|---|---|---|
| JP | 2004-245918 | 9/2004 |
| WO | 2005-031412 A1 | 4/2005 |

* cited by examiner

*Primary Examiner*—Joshua L Pritchett
(74) *Attorney, Agent, or Firm*—Renner, Otto, Boisselle & Sklar, LLP

(57) ABSTRACT

An optical film is provided for use in a light source or display to provide rapid cut-off of illumination with angle. The film comprises a light-transmissive substrate of a material having a reflective index greater than one and having first and second major surfaces. A surface relief is formed on at least one of the major surfaces and includes a mirror structure. The mirror structure comprises a groups of specularly reflective surfaces alternating in at least one direction with groups of transmissive surfaces. The film directs light passing therethrough into a desired angular output range, and light reflected back by the mirror structure is returned to a light source for recycling to enhance display brightness.

53 Claims, 25 Drawing Sheets

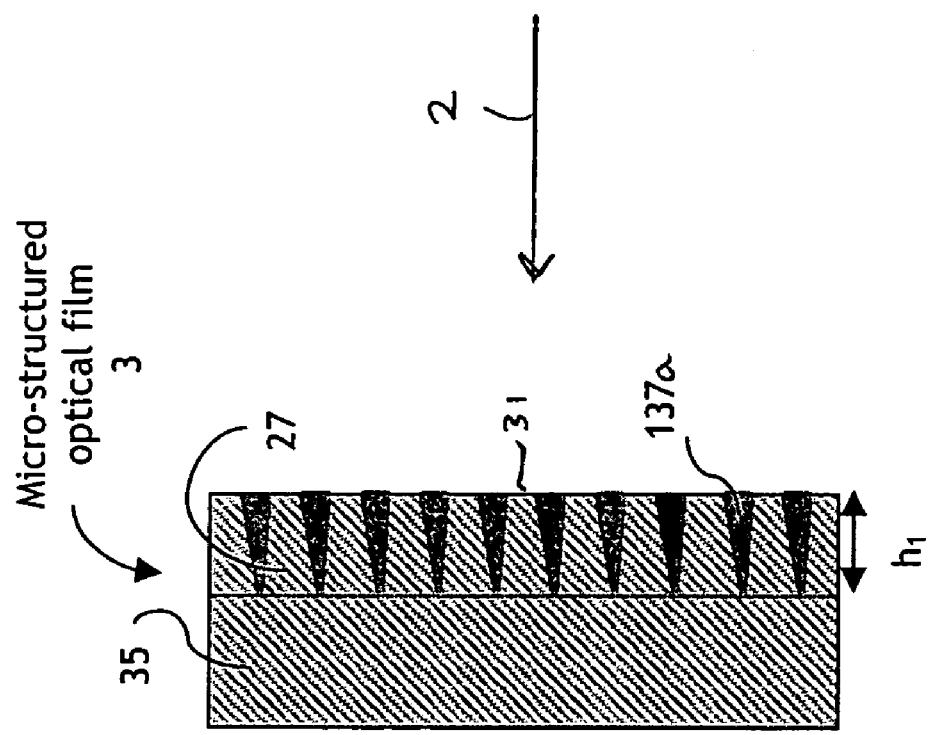

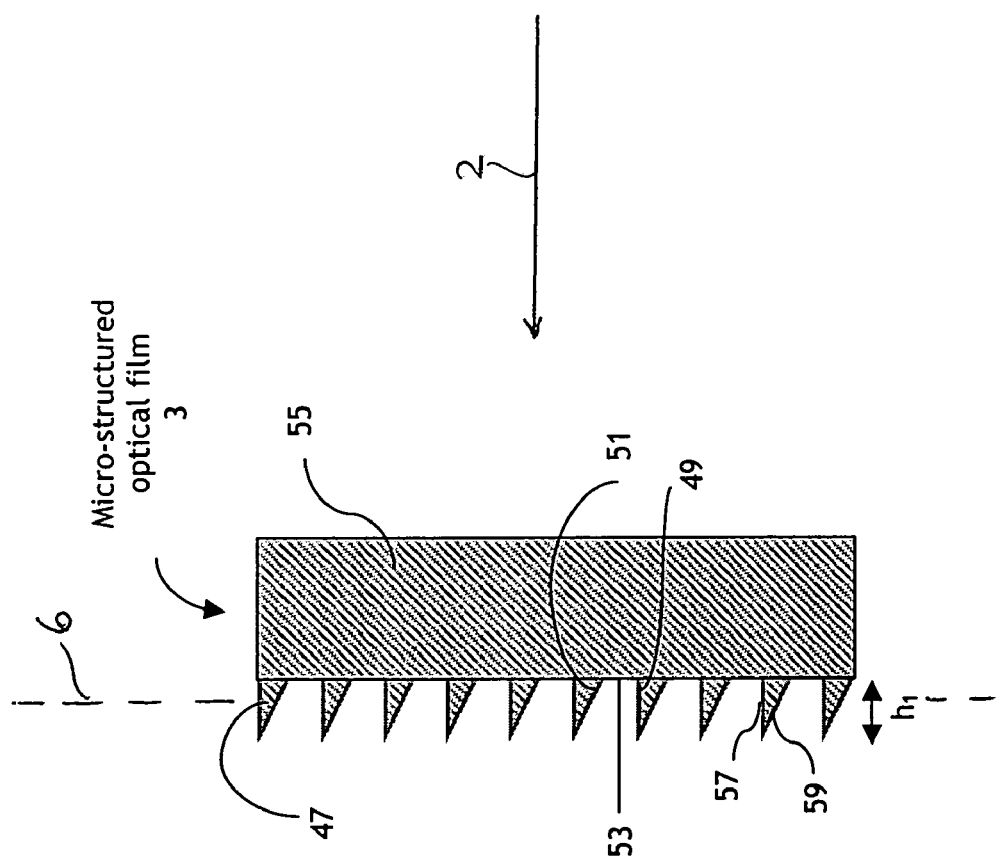

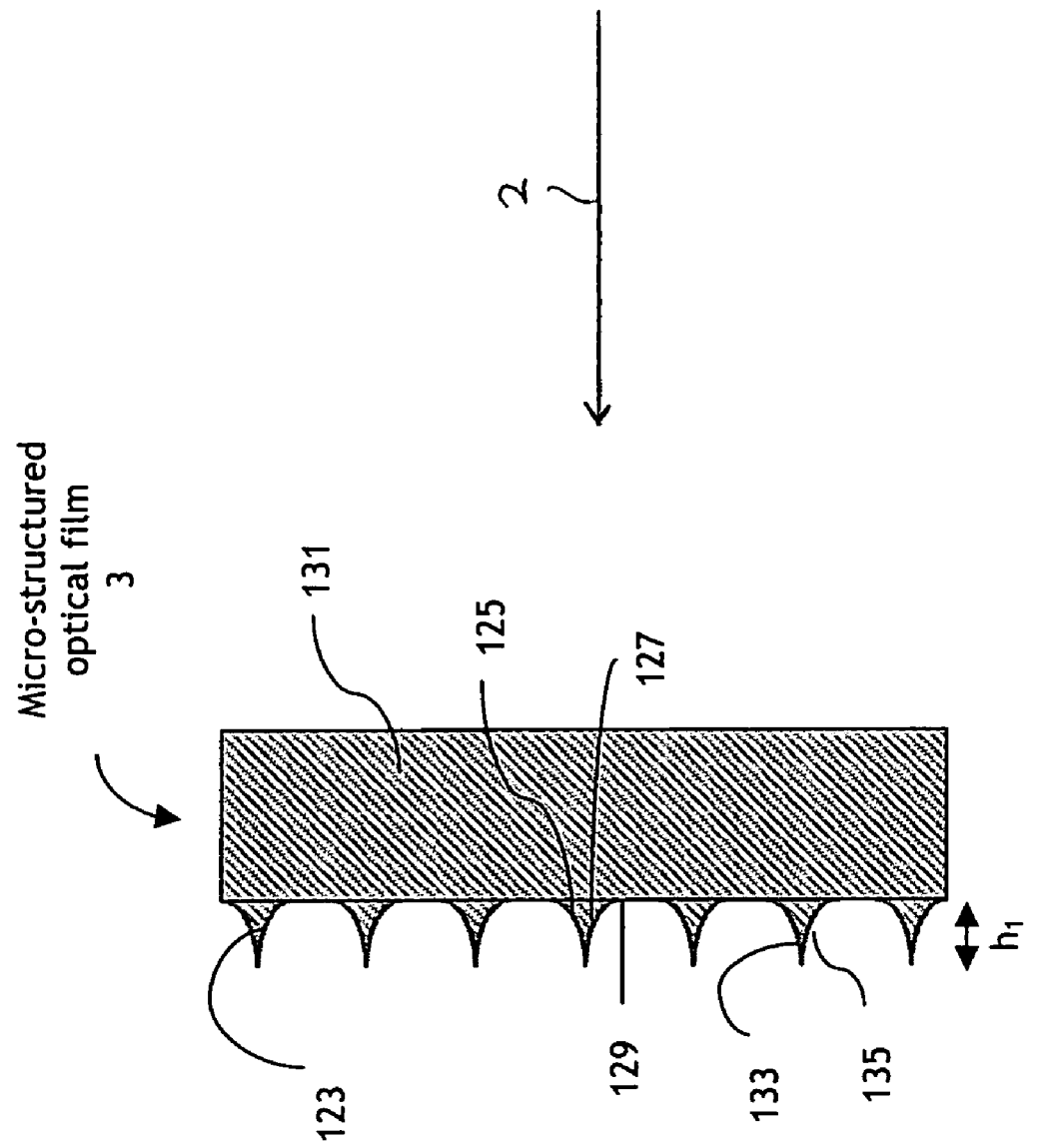

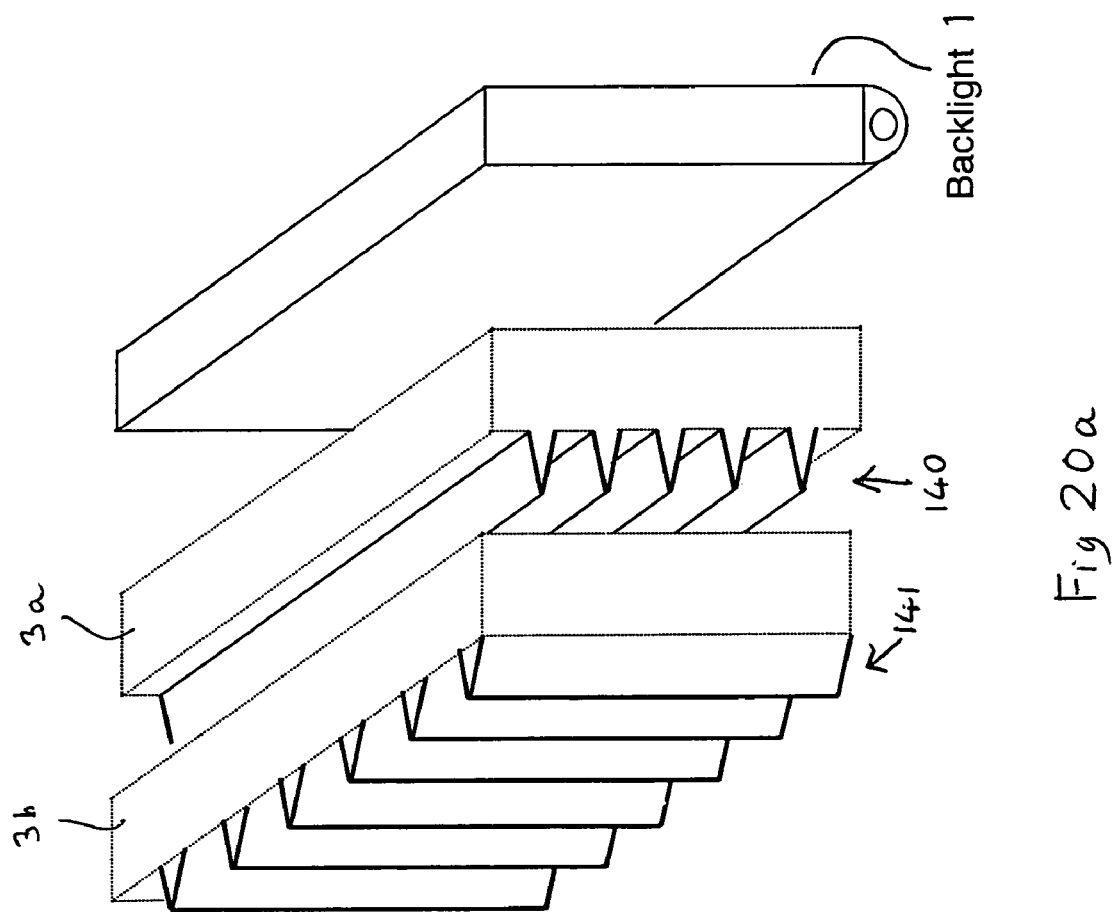

OPTICAL FILM, ILLUMINATOR AND DISPLAY

TECHNICAL FIELD

The present invention relates to an optical film. Such a film may be used in an illuminator or in a display, for example to control the angle of illumination or the viewing angle. The present invention also relates to an illuminator and to a display including such an optical film.

BACKGROUND

There are many applications of illuminators and displays where the angle of light output or the display viewing angle is required to be controlled or limited. For example, in automotive applications of displays, it is desirable to restrict the vertical output angle of light from the display so as to prevent undesirable reflections from a vehicle windscreen in order to reduce or avoid driver distraction. Also, light propagating generally downwardly, for example towards the floor, is wasted and represents a reduction in efficiency of light utilisation.

US Re 27617 discloses a known type of louvred film for controlling the output angle of light from a display. The film comprises alternating transparent and opaque layers in an arrangement which is similar to a Venetian blind. Such an arrangement passes light which is propagating in a direction parallel and nearly parallel to the planes of the layers but absorbs light propagating at larger angles to these planes. Thus, light propagating in undesirable directions is absorbed and this reduces the efficiency of light utilisation.

JP 2004/245918 discloses a similar type of louvered film but modified to comprise transparent, reflecting and opaque layers. Again, light propagating parallel and nearly parallel to the louvre planes is transmitted. Light propagating at higher angles to the planes and generally upwardly is reflected downwardly into a non-viewing region whereas light propagating at higher angles generally downwardly is absorbed. Again, the efficiency of light utilisation is relatively low.

U.S. Pat. No. 6,091,547 discloses the use of a prismatic film, which collects light from "off-axis" directions and redirects it into "on-axis" directions. This improves the efficiency of light utilisation by redirecting light, which would otherwise be wasted, into a display viewing region. However, substantial amounts of light are still transmitted outside the viewing region.

WO 05031412 discloses a planar waveguide forming part of a backlight of a three dimensional display. The waveguide receives light from one of its edges and the light propagates within the waveguide by total internal reflection. A series of grooves is cut into an output surface of the waveguide to permit light to exit the waveguide. The grooves act as parallel spaced line sources of light.

U.S. Pat. No. 4,726,662 discloses a display which selectively scatters or transmits light in response to an appropriate input. A light source is disposed behind the display device and includes a prismatic lens for focusing ambient transmitted light onto a light-absorbing surface so as to enhance display contrast.

US 2003/0035231 discloses an optical film for a reflective display. The film is disposed behind a light-modulating layer of the display and comprises a prismatic reflective structure.

SUMMARY

According to a first aspect of the invention, there is provided an optical film comprising a light-transmissive substrate of a material having a refractive index greater than one, the substrate having first and second major surfaces, one of which has a first surface relief on which is formed a mirror structure, the mirror structure comprising a plurality of transmissive surfaces and a plurality of reflective surfaces which are specularly reflective towards the material of the substrate, first groups of the reflective surfaces alternating in a first direction with second groups of the transmissive surfaces, where each of the first groups comprises at least one reflective surface and each of the second groups comprises at least one transmissive surface, all of the reflective surfaces being non-parallel to a first plane in which the first surface relief extends and at least some of the reflective surfaces being non-perpendicular to the first plane such that, for light propagating through the film from the first surface to the second surface, light in a first angular input range in a second plane perpendicular to the first plane passes through the film without reflection into a first angular output range in the second plane and light in a second angular input range on a first side of the first input range is reflected by the mirror structure so as to exit the second surface in a second angular output range, which is in the second plane and which at least partially overlaps the first output range.

The first and second input ranges may be contiguous with each other.

The reflective surfaces may be such that light in a third angular input range, on a second side of the first input range opposite the first side, is reflected by the mirror structure so as to exit the second surface in a third angular output range, which is in the second plane and which at least partially overlaps the first output range. The first and third input ranges may be contiguous with each other.

The reflective surfaces may substantially occlude light from exiting the second surface outside a desired angular output range. The reflective surfaces may reflect the occluded light back from or through the first surface. The second surface may have the first surface relief and the reflective surfaces may reflect the occluded light back through the substrate. As an alternative, the first surface may have the first surface relief. Each of the first groups may comprise first and second ones of the reflective surfaces defining a groove.

The first surface may have the first surface relief and each of the first groups may comprise first and second ones of the reflective surfaces defining a groove. Each of the grooves may be filled with a reflective fill. Each of the fills may have a specularly reflective surface facing away from the substrate. Each of the grooves may be filled with a substantially non-reflective fill. The fills may be transmissive. Each of the fills may have formed thereon a specularly reflective layer.

The first surface relief may comprise a one-dimensional array of ridges. The ridges may be of constant cross-sectional size and shape along their lengths. The ridges may be contiguous.

Each ridge may comprise first and second reflective surfaces tapering towards each other to a transmissive surface, which is substantially parallel to the first plane.

Each ridge may be of triangular cross-section. The ridges may have reflective surfaces and may be spaced apart by transmissive surfaces. As an alternative, the ridges may be contiguous and each may comprise an at least partially reflective surface and a transmissive surface.

Third groups of the reflective surfaces may alternate, in a second direction orthogonal to the first direction, with fourth groups of the transmissive surfaces, where each of the third groups comprises at least one reflective surface and each of the fourth groups comprises at least one transmissive surface, and may be such that, for light propagating through the film from the first surface to the second surface, light in a fourth angular input range in a plane perpendicular to the first and second planes passes through the film without reflection into a fourth angular output range in the third plane and light in a fifth angular input range on a first side of the fourth input range is reflected by the mirror structure so as to exit the second surface in a fifth angular output range, which is in the third plane and which at least partially overlaps the fourth output range.

The first surface relief may comprise a two-dimensional array of ridges.

The fourth and fifth input ranges may be contiguous with each other.

The reflective surfaces may be such that light in a sixth angular input range, on a second side of the fourth input range opposite the first side of the fourth input range, is reflected by the mirror structure so as to exit the second surface in a sixth angular output range, which is in the third plane and which at least partially overlaps the fourth output range. The fourth and sixth input ranges may be contiguous with each other.

The first surface relief may be planarised.

The other of the first and second surfaces may have a second surface relief. All of the surfaces of the second relief may be transmissive. The second surface relief may be planarised.

At least some of the reflective and transmissive surfaces may be plane.

At least some of the reflective and transmissive surfaces may be curved surfaces. The first surface may have the first surface relief and the curved surfaces may be convexed. As an alternative, the second surface may have the first surface relief and the curved surfaces may be concave.

The first and second surfaces may extend in substantially parallel planes.

According to a second aspect of the invention, there is provided an illuminator comprising: a light source having an exit surface; an optical film disclosed adjacent the exit surface and comprising a light-transmissive substrate of a material having a refractive index greater than one, the substrate having first and second major surfaces, one of which has a first surface relief on which is formed a mirror structure, the mirror structure comprising a plurality of transmissive surfaces and a plurality of reflective surfaces which are specularly reflective towards the material of the substrate, first groups of the reflective surfaces alternating in a first direction with second groups of the transmissive surfaces, where each of the first groups comprises at least one reflective surface and each of the second groups comprises at least one transmissive surface, all of the reflective surfaces being non-parallel to a first plane in which the first surface relief extends and at least some of the reflective surfaces being non-perpendicular to the first plane such that, for light propagating through the film from the first surface to the second surface, light in a first angular input range in a second plane perpendicular to the first plane passes through the film without reflection into a first angular output range in the second plane and light in a second angular input range on a first side of the first input range is reflected by the mirror structure so as to exit the second surface in a second angular output range, which is in the second plane and which at least partially overlaps the first output range.

According to a third aspect of the invention, there is provided a display comprising a spatial light modulator, a light source having an exit surface, and an optical film comprising a light-transmissive substrate of a material having a refractive index greater than one, the substrate having first and second major surfaces, one of which has a first surface relief on which is formed a mirror structure, the mirror structure comprising a plurality of transmissive surfaces and a plurality of reflective surfaces which are specularly reflective towards the material of the substrate, first groups of the reflective surfaces alternating in a first one direction with second groups of the transmissive surfaces, where each of the first groups comprises at least one reflective surface and each of the second groups comprises at least one transmissive surface, all of the reflective surfaces being non-parallel to a first plane in which the first surface relief extends and at least some of the reflective surfaces being non-perpendicular to the first plane such that, for light propagating through the film from the first surface to the second surface, light in a first angular input range in a second plane perpendicular to the first plane passes through the film without reflection into a first angular output range in the second plane and light in a second angular input range on a first side of the first input range is reflected by the mirror structure so as to exit the second surface in a second angular output range, which is in the second plane and which at least partially overlaps the first output range.

The optical film may be disposed between the exit surface and the modulator.

The reflective surfaces may substantially occlude light from exiting the second surface outside a desired angular output range. The reflective surfaces may reflect at least part of the occluded light back towards the light source and the light source may return at least some of the reflected occluded light to the film. The second surface may have the first surface relief and the reflective surfaces may reflect the occluded light back through the substrate. As an alternative, the first surface may have the first surface relief. Each of the first groups may comprise first and second ones of the reflective surfaces defining a groove.

The first surface may have the first surface relief and each of the first groups may comprise first and second ones of the reflective surfaces defining a groove. Each groove may be filled with a reflective fill. Each of the fills may have a specularly reflective surface facing away from the substrate. Each of the grooves may be filled with a substantially non-reflective fill. The fills may be transmissive. Each of the fills may have formed thereon a specularly reflective layer.

It is thus possible to provide arrangements which have a sharper cut-off of light propagation with angle of propagation. This may be used to restrict the visibility of displays and to reduce substantially emission of light into undesirable viewing regions, for example so as to avoid or reduce potentially distracting reflections in vehicle windscreens. Light is redirected into, for example, the desired viewing angle range so that the efficiency of light utilisation is improved. Light whose transmission is blocked may be returned, for example to a backlight arrangement for recycling. Such recycled light is then directed back towards the optical film at least partially in the input acceptance angle so that displayed image brightness may be enhanced and/or light input power may be reduced.

BRIEF DESCRIPTION OF THE DRAWINGS

FIGS. 4a and 4b are cross-sectional diagrams of modified optical films of the type shown in FIG. 2;

FIG. 5 is a cross-sectional diagram of an optical film constituting a third embodiment of the invention;

FIGS. 18a and 18b are a cross-sectional diagrams of optical films constituting eighth and ninth embodiments of the invention;

FIG. 20a is a diagrammatic view of an illuminator constituting an eleventh embodiment of the invention;

DETAILED DESCRIPTION

Figure 1:
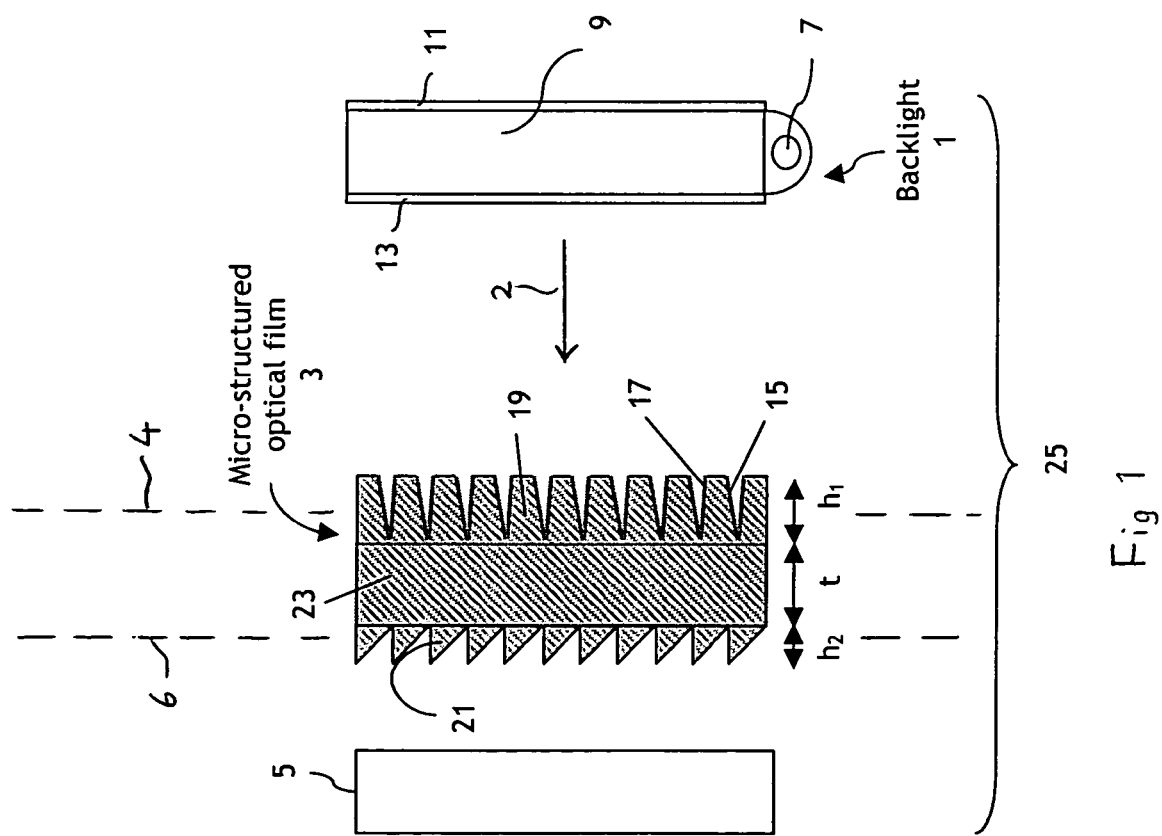
FIG. 1 is a cross-sectional diagram illustrating an optical film, an illuminator and a display constituting first embodiments of the invention.

The display 25 shown in FIG. 1 comprises a backlight 1, which supplies light generally in a direction 2 through a "micro-structured" optical film 3 to a display panel 5. The backlight 1 comprises a light source 7, for example in the form of one or more cold cathode fluorescent lamps or light emitting diodes, a waveguide 9, a reflector 11 and a diffuser 13. In this example, light from the light source 7 enters the waveguide 9 through an edge surface thereof and is guided by total internal reflection. As an alternative, light from the light source 7 may enter the waveguide 9 through a major surface thereof by a technique known as top-coupling. The waveguide 9 has a plurality of exit points on its surface adjacent the diffuser 13. The exit points (not shown) allow light within the waveguide 9 to escape and are patterned and arranged so as to provide a relatively uniform illumination. The diffuser 13 is arranged to provide the light emerging from the backlight 1 with a relatively uniform illumination profile.

The display panel 5 is of the transmissive or transflective (transmissive/reflective) type and is arranged to modulate the light passing through it from the backlight 1 and the optical film 3 with an image or a sequence of images. The panel 5 may be of any suitable light-modulating or "light valve" type, such as a liquid crystal device.

The optical film 3 is arranged to redirect light incident on it from the backlight 1 in one or more angular input ranges so as to limit the output range of light from the film 3 towards the panel 5. The film 3 also provides a sharper cut-off in luminance with angle in the plane of FIG. 1. The film 1 is made of a material, such as acrylic or polycarbonate, which is transparent to visible light. The refractive index of the material is greater than one.

The optical film 3 has first and second major surfaces which, in this embodiment, both have a surface relief. The surface reliefs of these major surfaces extend in respective planes 4 and 6, which are vertical during the intended use of the display 25 and perpendicular to the plane of FIG. 1. In this embodiment, the planes 4 and 6 are parallel to each other but, in alternative embodiments, the planes 4 and 6 may subtend a small acute angle so as to give the optical film 3 a shallow wedged-shaped profile or cross-section.

The first and second surface reliefs comprise one-dimensional arrays of ridges extending perpendicularly to the plane of FIG. 1. The ridges are contiguous with each other transversely to their longitudinal directions and are in the form of microprisms with substantially the same shape and size throughout their extent. Each prism, such as 19, of the first surface relief has first and second surfaces which taper towards each other and towards a further surface substantially parallel to the plane 4. The first surface relief carries a mirror structure comprising surfaces such as 15 and 17, which are specularly reflective on both sides. The reflective surfaces alternate with the transmissive surfaces which are parallel to the plane 4.

The prisms 21 of the second surface relief are of triangular cross-section. In the embodiment shown in FIG. 1, the cross-section is in the shape of a right-angled triangle. All of the surfaces of the prisms 21 are transmissive but, in other embodiments, there may be transmissive and reflective surfaces in the second relief.

The mirror structure is such that all of the reflective surfaces 15 and 17 are non-parallel to the plane 4. Further, the reflective surfaces are such that at least some of them are non-perpendicular to the plane 4. In the embodiment illustrated in FIG. 1, all of the surfaces 15 and 17 are non-perpendicular to the plane 4.

There is no relationship between the thickness t of a base substrate 23 of the optical film 3 and the heights $h_1$ and $h_2$ of the prisms 19 and 21. The base thickness t may therefore be selected for convenience, for example so as to assist in providing an acceptably small thickness of the display 25 and for ease of manufacture of the film 3. One example of a suitable thickness t of the base substrate 23 is of the order of 150 microns but any desired thickness may be used.

During use of the display 25, light is incident on the optical film 3 from a relatively large angularly input range from the backlight 1. For example, the angular input range may be substantially symmetrical in the vertical plane about the input direction normal to the plane 4. A large proportion of the light incident on the first major surface on the film 3 passes through the transparent portion of the surface between the reflective surfaces. Light incident on the reflective surfaces 15 and 17 is at least partially reflected back towards the backlight 1. This returning light is reflected from the diffuser 13, the waveguide 9 or the reflector 11 back towards the optical film 3 so that a substantial proportion of the light reflected from the mirror structure is "recycled" so as to improve the efficiency of light utilisation and the display brightness within the intended viewing range.

The light which passes through the optical film 3 is partially redirected, for example by reflection and/or refraction, so as to be concentrated in the desired angular output range corresponding to the desired angular viewing range in the vertical plane of the display. The optical film 3 in this embodiment has little or no effect on the angular range in the horizontal plane (perpendicular to the plane of FIG. 1 and containing or parallel to the light propagation direction 2). Some of the light propagating through the film 3 passes therethrough without reflection and exits in part or all of the desired angular output range in the vertical plane. Other portions of the light passing through the film 3 are reflected by the reflective surfaces 15 and 17 so as to exit in the desired angular output range. The structure of the optical film 3 is such as to provide a rapid decrease in light output with angle at one end or at both ends of the angular output range. This reduces the amount of light emitted by the display 25 at undesirable angles, for example so as to reduce distracting reflections from reflective surfaces in the vicinity of the display. When the display 25 is used, for example, in the dashboard of a vehicle, this reduces potentially distracting reflections from the vehicle windscreen.

Concentrating light into the desired angular output range in which a viewer will be located improves the utilisation of light in the display. Recycling of light from the reflective structure improves the efficiency of utilisation. It is thus possible to provide a display of improved brightness for a given light output from the light source 7 with reduced unused and undesirable light output.

The surface reliefs of the optical film 3 comprise a periodic structure, which may cause Moiré patterns with other periodic structures within the display 25. For example, the panel 5 typically comprises rows and columns of pixels and Moiré beating between the periodic structures may cause visible patterns which are distracting to a viewer. In order to reduce or eliminate such Moiré patterns, the alignment of the ridges or prisms 19 and 21 may be tilted slightly about an axis in the light propagation direction 2. As an alternative, where only one of the major surfaces of the film 3 has a surface relief, the other major surface may be provided, for example by embossing, with a pattern suitable for reducing or minimising the effects of Moiré patterns.

Figure 2:
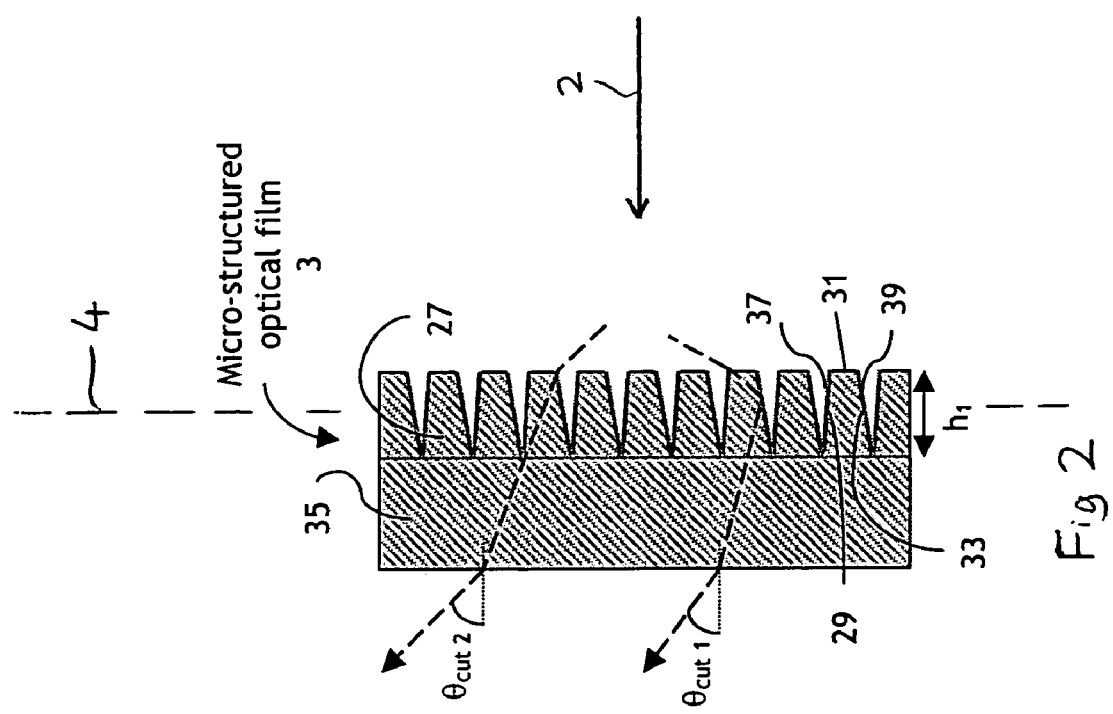
FIG. 2 is a cross-sectional diagram of an optical film constituting a second embodiment of the invention.

FIG. 2 illustrates another optical film 3 having a plane output surface and an input surface provided with surface relief of the type illustrated in FIG. 1. The surface relief comprises a one-dimensional array of prisms with each prism having a trapezoidal cross-section transverse to the direction in which each ridge or prism 27 extends. Each prism thus has first, second and third facets 29, 31 and 33, respectively. The array is formed on a base substrate 35. The first and second facets 29 and 33 are provided, for example by coating, with specularly reflecting mirrors 37 and 29. The second facets 31 are transmissive.

The refractive index of the material of the film 3 together with the height $h_1$ of the prisms 27 and the angles of the facets 29, 31 and 33 are selected so as to control the cut-off angles $\theta_{cut1}$ and $\theta_{cut2}$. The cut-off angle $\theta_{cut1}$ is the largest possible angle, on one side of the normal to the output surface, for light rays which are reflected from the reflective surfaces or mirrors 39. The cut-off angle $\theta_{cut2}$ is the largest angle on the same side of the normal for light rays passing through the film 3 without reflection. If these cut-off angles are arranged to be substantially the same, a very sharp drop in luminance with angle to the normal may be obtained and this angle may be selected by suitably choosing the appropriate parameters of the structure of the film 3.

Figure 3:
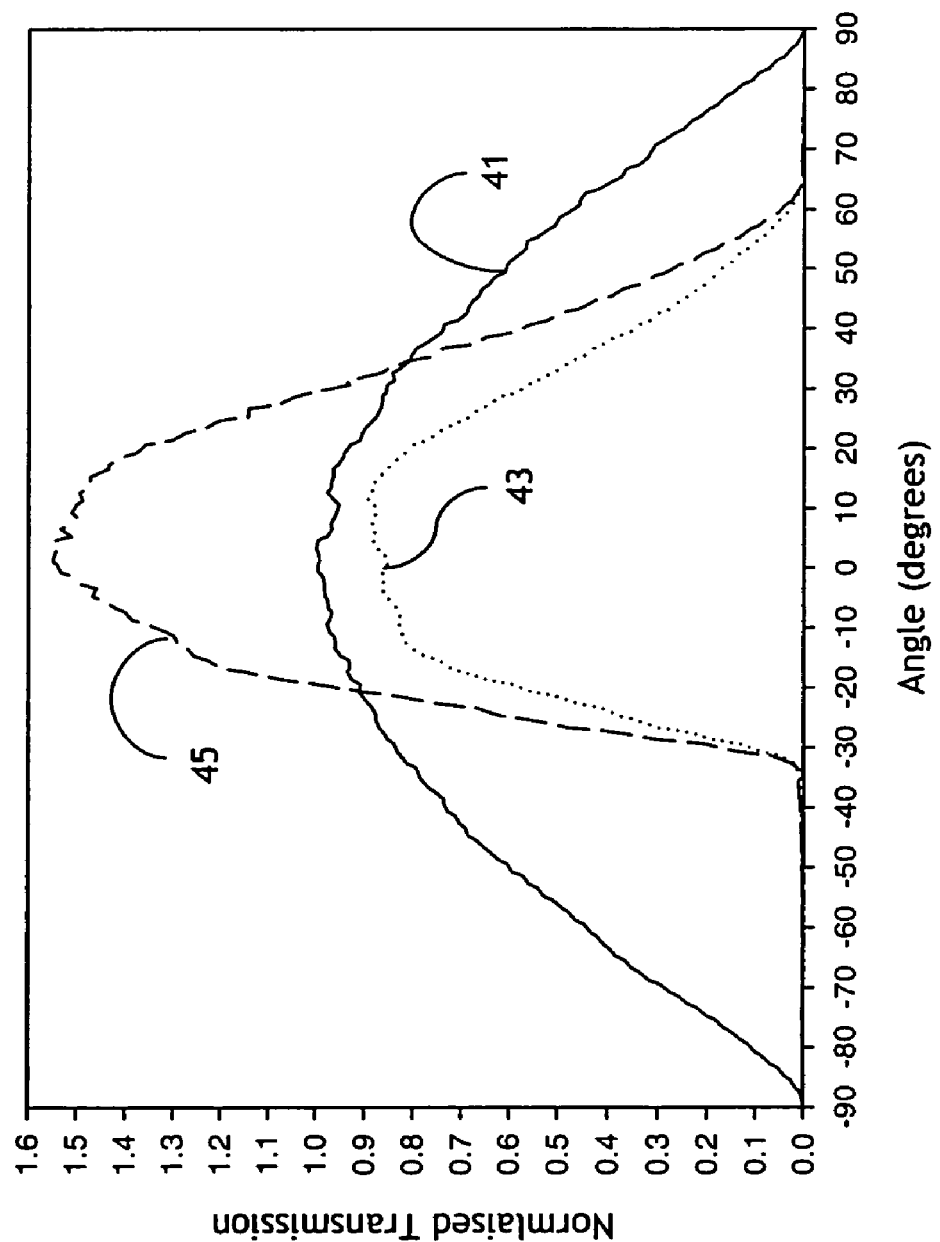
FIG. 3 is a graph of light intensity in arbitrary units against output angle in a vertical plane illustrating the performance of the optical film of FIG. 2.

FIG. 3 illustrates the modeled optical performance for an example of the optical film 3 shown in FIG. 2 and comprising an acrylic polymer with a refractive index of approximately 1.49. The first, second and third facets 29, 31 and 33 are oriented at angles of 87°, 0° and 79° in the vertical plane with respect to the plane 4. The facets 31 thus extend in planes substantially parallel to the plane 4 whereas the facets 29 and 33 extend in planes at a small acute angle to and on opposite sides of the normal to the plane 4.

The curve 41 illustrates luminance as a function of angle for the backlight 1 in the absence of any optical film 3. This curve is normalised so that its maximum value is equal to 1 and the vertical axis is calibrated in arbitrary units. The horizontal axis is calibrated in degrees and represents the angle between light output direction in a vertical plane above and below the horizontal. In this graph, negative values of angles represent angle above the horizontal direction whereas positive values represent angle below the horizontal direction.

The curve 41 illustrates that there is a relatively slow decline in luminance with angle away from the horizontal. Thus, substantial amounts of light are emitted at angles beyond −30°. This may well result in relatively bright potentially disturbing reflections from the windscreen of a vehicle.

The curve 43 illustrates the optical performance with the optical film 3 of FIG. 2. Beyond the angles −35° and +60°, there is very little light output from the film 3. Thus, very little light is directed towards a vehicle windscreen so that potentially disturbing or distracting reflections may be greatly reduced or substantially eliminated. Less light is wasted by being directed towards the vehicle floor.

The curve 43 illustrates the performance without taking into account recycling of light reflected by the reflective structure. Thus, within the designed or intended vertical viewing angular range, the brightness of the display would be reduced by about 10%. However, when recycling of light reflected back from the reflective structure and returned by the backlight is taken into account, the curve 45 is obtained. This curve demonstrates the same rapid cut-off of luminance with angle and illustrates that an increase in display brightness of approximately 50% can be achieved.

The optical film 3 in FIG. 2 has been described as providing reduced output angular range in the vertical plane. This film does not provide any substantial change in the horizontal angular output range. However, if desired, the film 3 may be oriented differently, for example so as to provide reduced angular output in a horizontal plane without substantially affecting the angular output in a vertical plane.

Figure 4B:
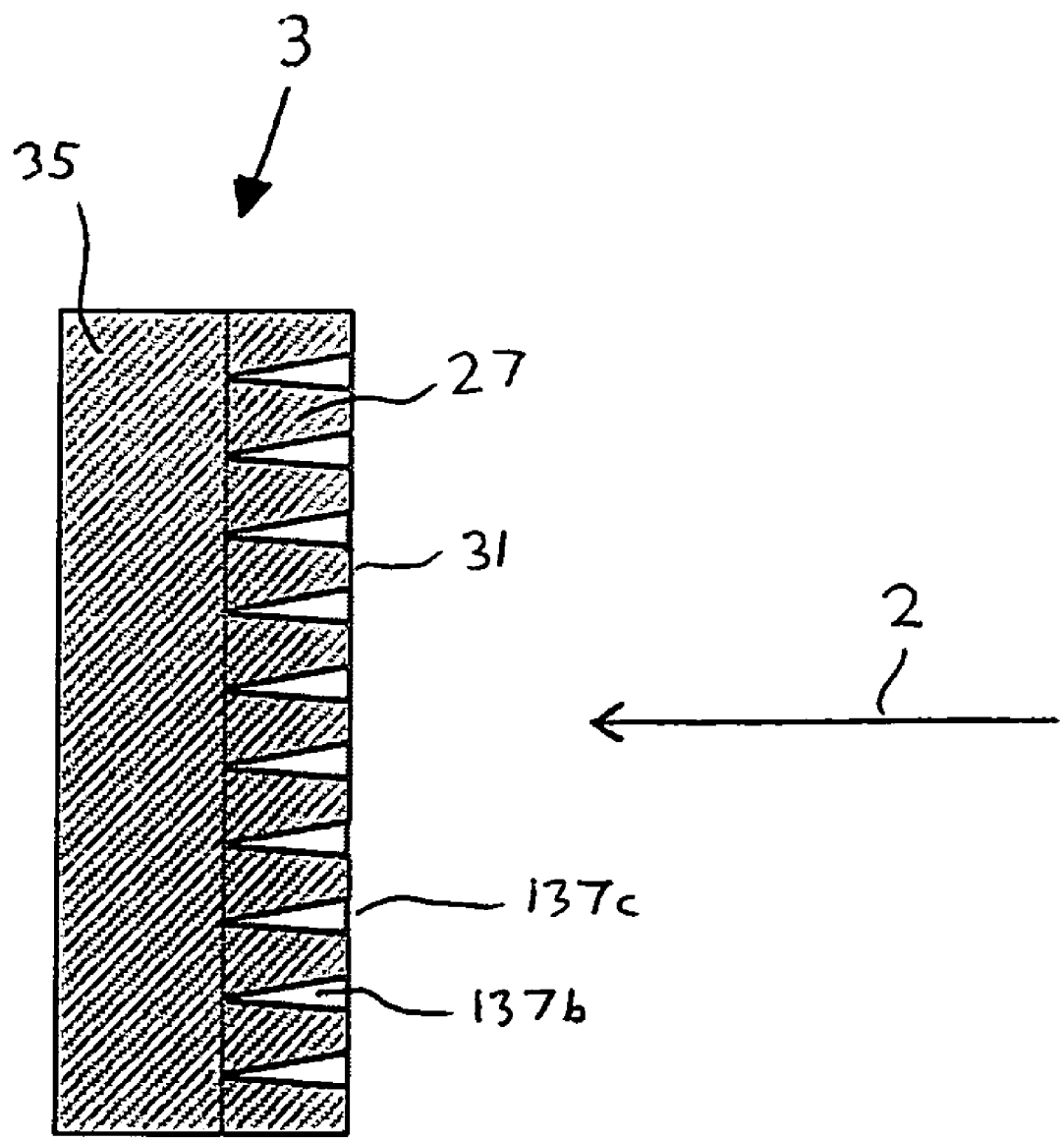

FIGS. 4*a* and 4*b* illustrate optical films 3 of the type shown in FIG. 2. The optical film 3 of FIG. 4*a* differs from that of FIG. 2 in that the gaps between the prisms or ridges 27 are filled with a reflective material 137*a*, such as aluminium. In the example shown in FIG. 4*a*, these gaps are filled to the extent that the input major surface of the film 3 is effectively planarised. Light incident on the reflective material 137*a* is thus reflected back directly towards the backlight whereas light incident on the transmissive second facets 31 propagates as described hereinbefore for the embodiment of FIG. 2.

The optical film 3 of FIG. 4*b* differs from that of FIG. 4*a* in that the gaps between the ridges 27 are filled with a non-reflective material 137*b*. The material 137*b* may be any suitable material, for example for planarising or nearly planarising the surface of the film 3, and may, for example, be transparent or opaque. In the example illustrated in FIG. 4b, the surface of the material 137b is provided with a specularly reflective surface 137c, for example in the form of a coating, so that light incident thereon is reflected back directly towards the backlight.

Figure 6:
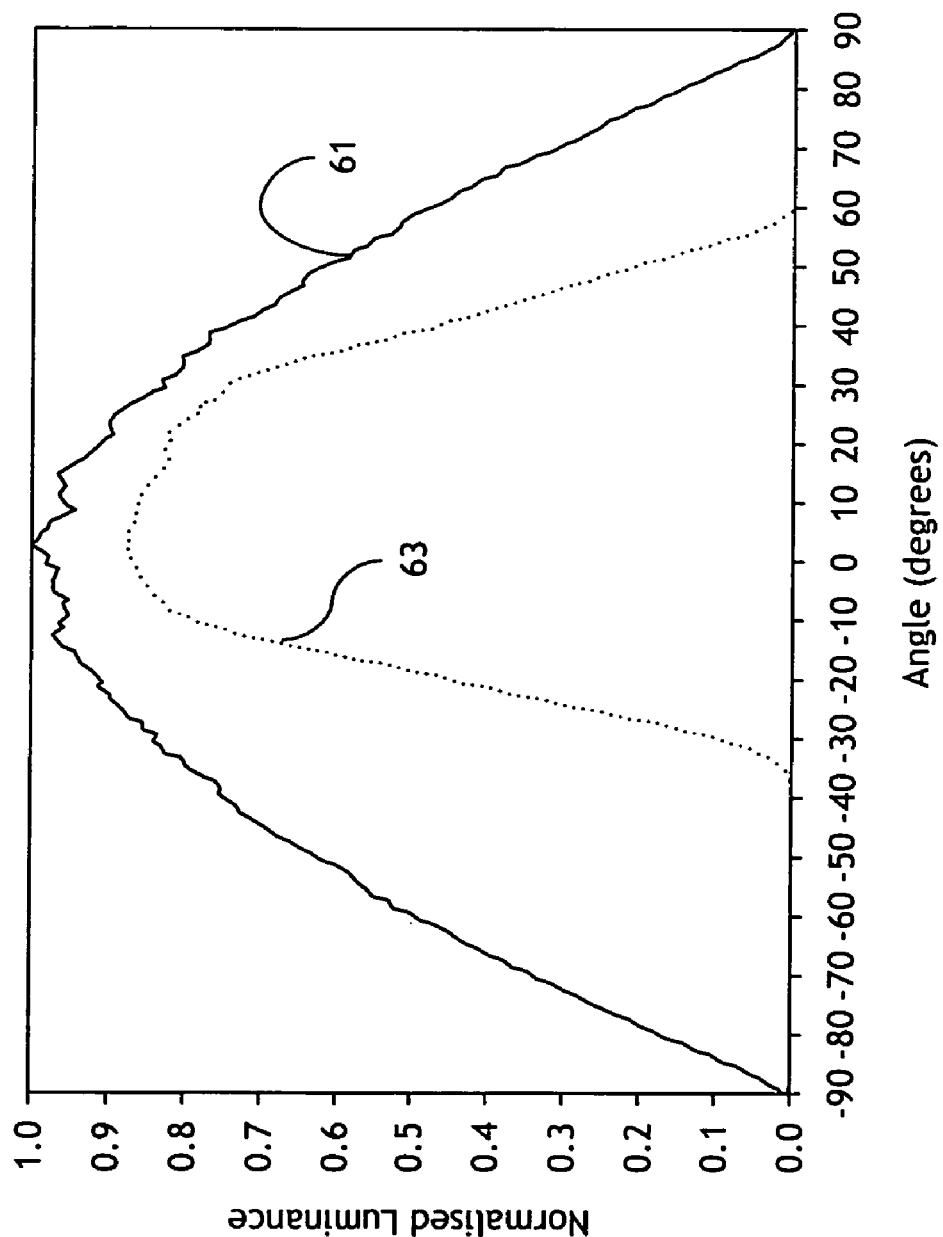
FIG. 6 is a graph of light intensity in arbitrary units against output angle in a vertical plane illustrating the performance of the optical film of FIG. 5.

FIG. 5 illustrates another optical film 3 comprising a base substrate 55 having a plane input major surface for light from the backlight received in the general direction 2. The output major surface has a surface profile comprising a one dimensional array of ridges or prisms 47 with each prism having a first facet 49 and a second facet 51. The prisms 47 are separated from each other by gaps formed by surfaces or facets 53. The first and second facets 49 and 51 are coated with specularly reflective mirror coatings 57 and 59 so as to be specularly reflective on both sides of the coatings. The facets 53 are transmissive. FIG. 6 illustrates the modeled optical performance for a particular example of the optical film 3 shown in FIG. 5 comprising an acrylic polymer of refractive index approximately 1.49. In this example, the prisms 47 have a height $h_1$ of 129 microns and the facets 49 and 51 are oriented at angles of 65° and 90° respectively to the plane 6. The facets or gaps 53 between the ridges are 74 microns wide.

The curve 61 again illustrates luminance as function of angle in the vertical plane for the backlight 1 without the film 3 whereas the curve 63 illustrate the optical performance when the optical film 3 of FIG. 5 is present. For output directions from the film 3 beyond angles of −35° and +60°, very little light exits the film 3 so that little or no light is directed towards a vehicle windscreen when such an arrangement is used within a vehicle and little light is wastefully directed towards the vehicle floor. The curve 63 illustrates performance in the absence of light recycling but, when this is taken into account, image brightness for a given light input is substantially increased in the output viewing angle compared with the performance for the backlight in the absence of the optical film.

Figure 7:
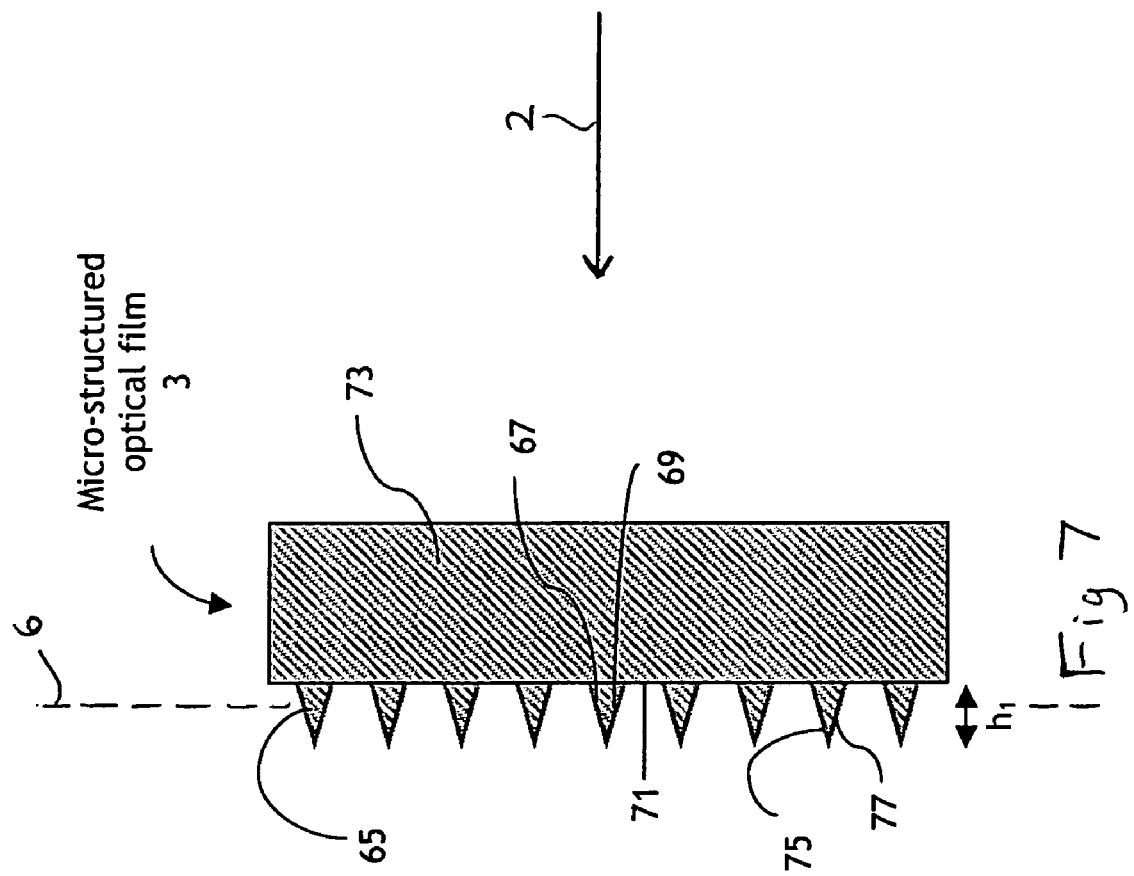
FIG. 7 is a cross-sectional diagram of an optical film constituting a fourth embodiment of the invention.

FIG. 7 illustrates another optical film comprising a base substrate 73 having a substantially plane input major surface and a surface relief on the output major surface. The surface relief comprises a one dimensional array of ridges or prisms 65 having first and second facets 67 and 69 and being separated by gaps or surfaces 71. The first and second facets 67 and 69 are coated with a specularly reflective mirror coating 75 and 77 so as to be specularly reflective on both sides of the coating.

Figure 8:
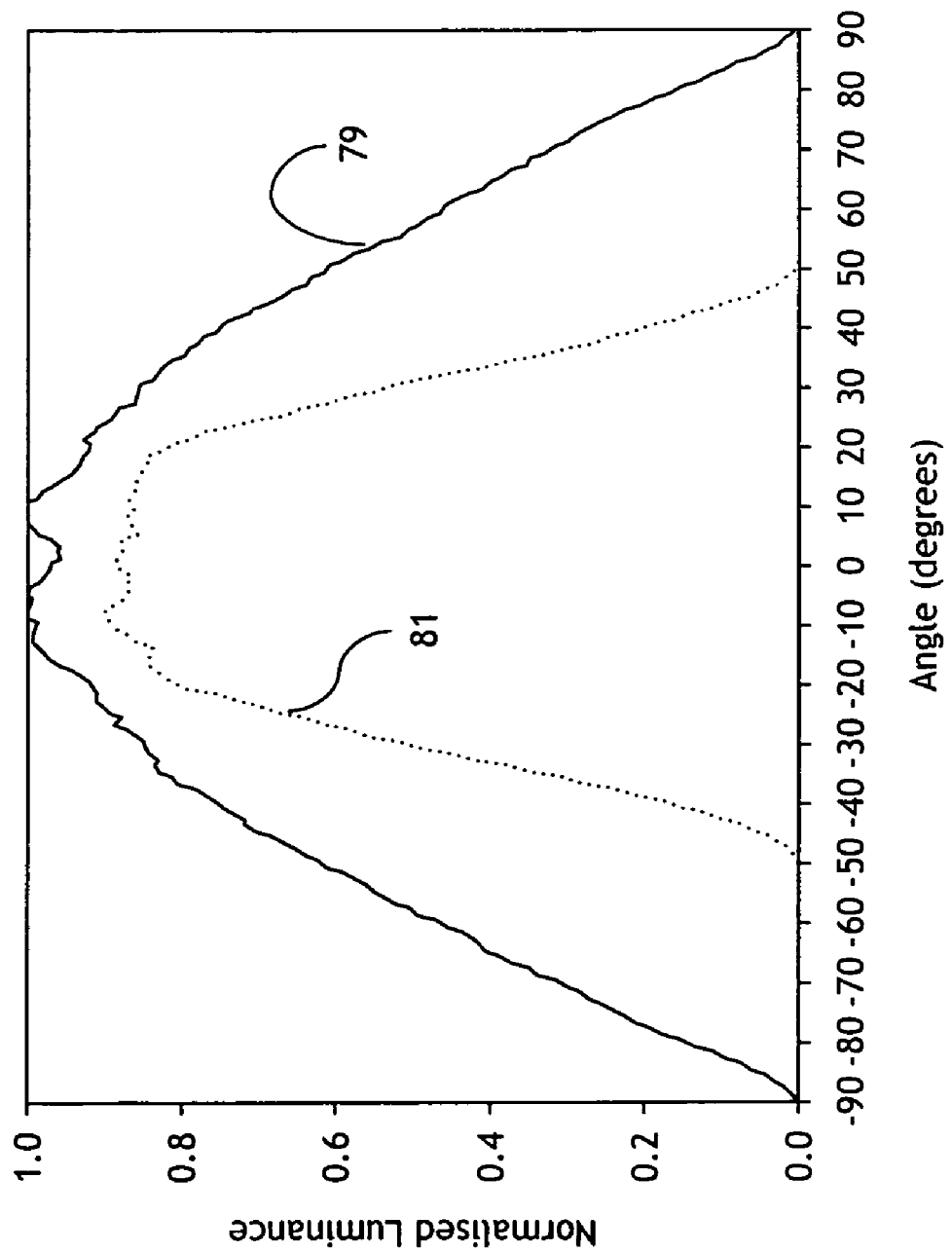
FIG. 8 is a graph of light intensity in arbitrary units against output angle in a vertical plane illustrating the performance of the optical film of FIG. 7.

The optical performance is illustrated in FIG. 8 for a film comprising an acrylic polymer of refractive index substantially 1.49. The prisms 65 have a height $h_1$ of 45 microns and the gaps 71 are 28 microns wide. The facets 67 and 69 are oriented at angles of 77.5° to the plane 6 on opposite sides of the normal to this plane. The curve 79 illustrates normalised luminance against angle in the vertical plane in the absence of the optical film 3 whereas the curve 81 illustrates performance when the optical film 3 is present. For this embodiment, the prisms 65 are symmetrical so that the curve 81 is symmetrical about the horizontal direction with very little light being emitted beyond angles of −50° and +50°. The curve 81 does not take into account light recycling but, when this is taken into account, an increase image brightness is provided within the angular viewing range of the display.

Figure 9:
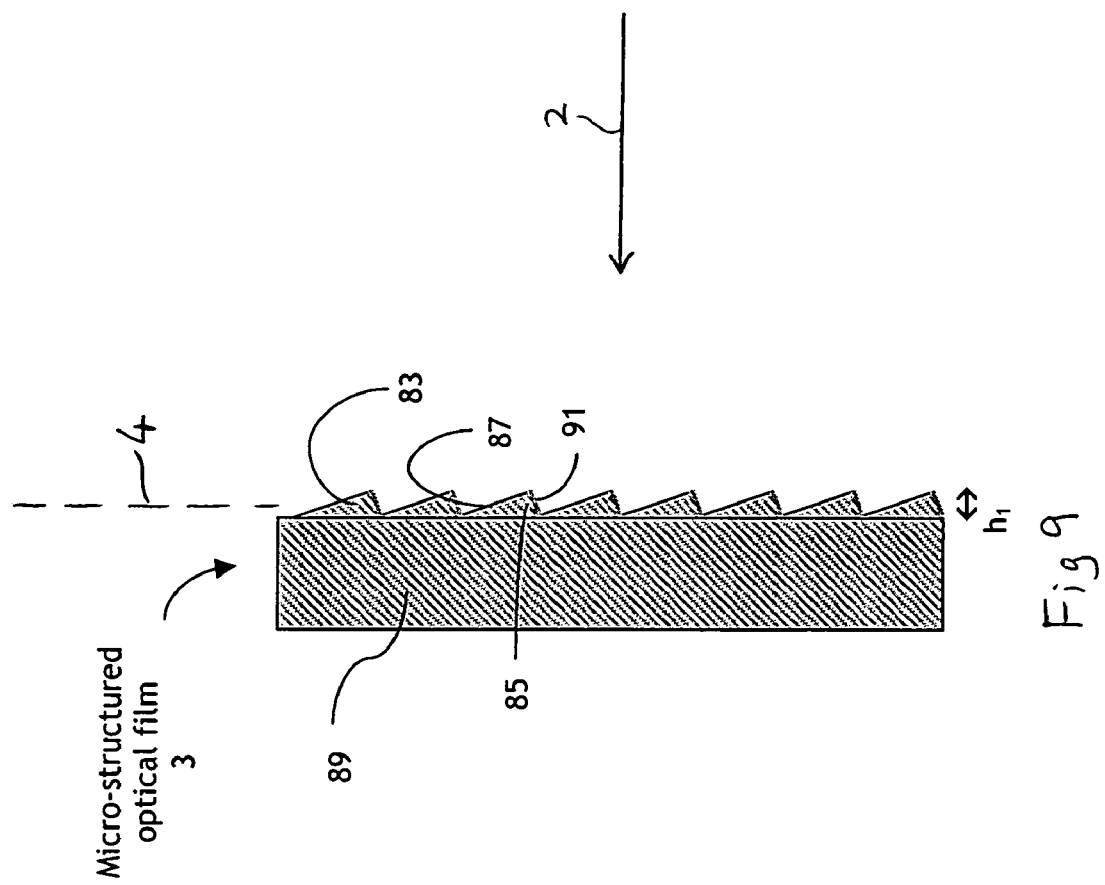
FIG. 9 is a cross-sectional diagram of an optical film constituting a fifth embodiment of the invention.

FIG. 9 illustrates an optical film formed on a base substrate 89 and having an input major surface provided with surface relief and a substantially plane output major surface. The surface relief is in the form of a one dimensional array of ridges or prisms 83 with each ridge or prism being in contact with the adjacent ridge or prism (i.e. contiguous). Each prism 83 has a first facet 85 and a second facet 87. Each first facet 85 is coated with a specularly reflective mirror coating 91 so as to be specularly reflective on both sides whereas each facet 87 is transmissive.

Figure 10:
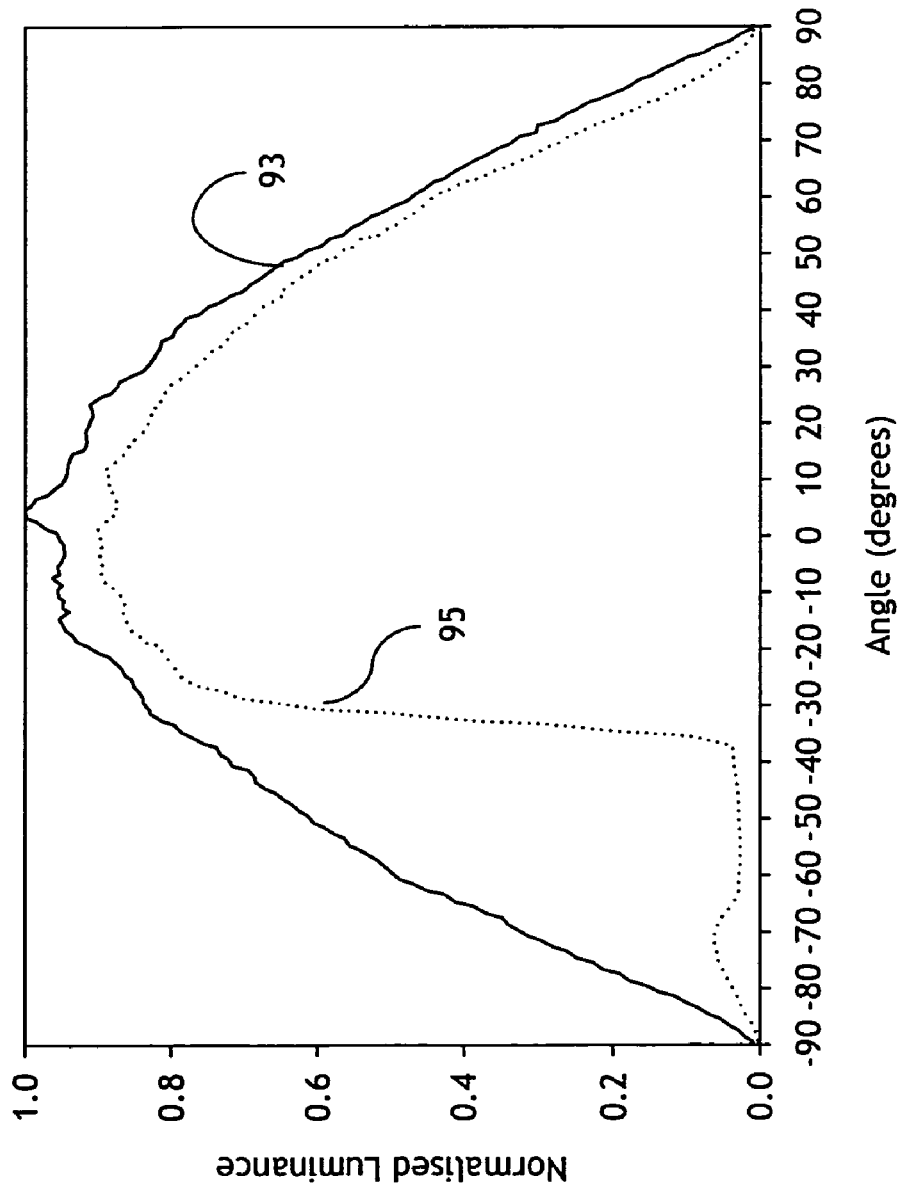
FIG. 10 is a graph of light intensity in arbitrary units against output angle in a vertical plane illustrating the performance of the optical film of FIG. 9.

FIG. 10 illustrates the optical performance of a film of type shown in FIG. 9 comprising an acrylic polymer of refractive index approximately 1.49. The prisms 83 are of height $h_1$ equal to 45 microns. The first and second facets 85 and 87 are oriented at angles of 70° and 20°, respectively, to the plane 4.

The curve 93 illustrates luminance against angle for a backlight in the absence of the film 3 whereas the curve 95 illustrates the performance for the presence of the film 3 but not taking into account light recycling. There is a relatively shape cut-off of light for angles beyond −40° although there is a small amount of light leakage in this angular range. The film has only a small effect for angles on the other side of the horizontal direction.

Figure 11:
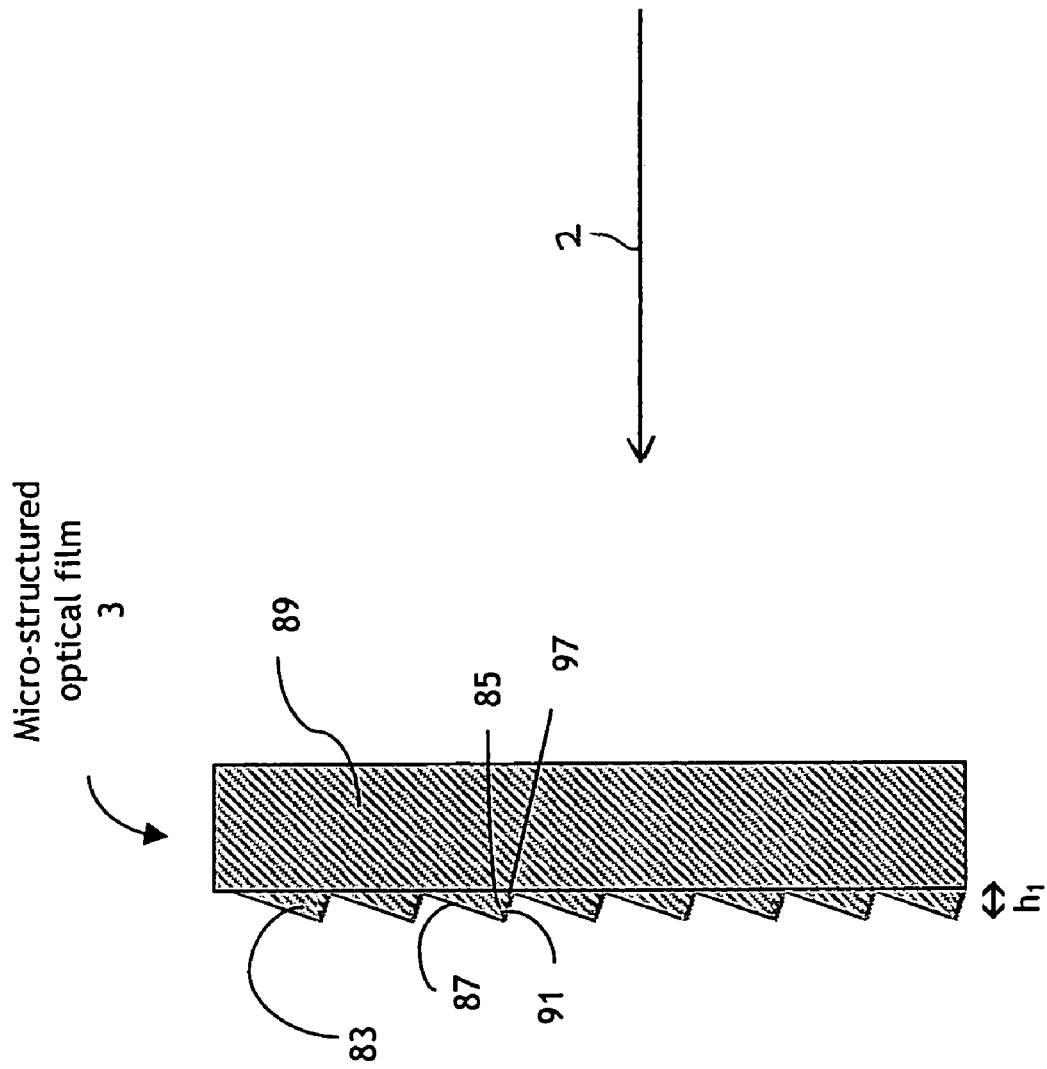
FIG. 11 is a cross-sectional diagram illustrating use of the optical film of FIG. 9 for the opposite direction of light propagation.

As shown in FIG. 11, the optical film 3 may be used for light propagating in the opposite general direction. Thus, when used in this way, the plane major surface of the film becomes the input surface for light travelling in the direction 2 and the other major surface of the film having the surface relief becomes the output surface.

Figure 12:
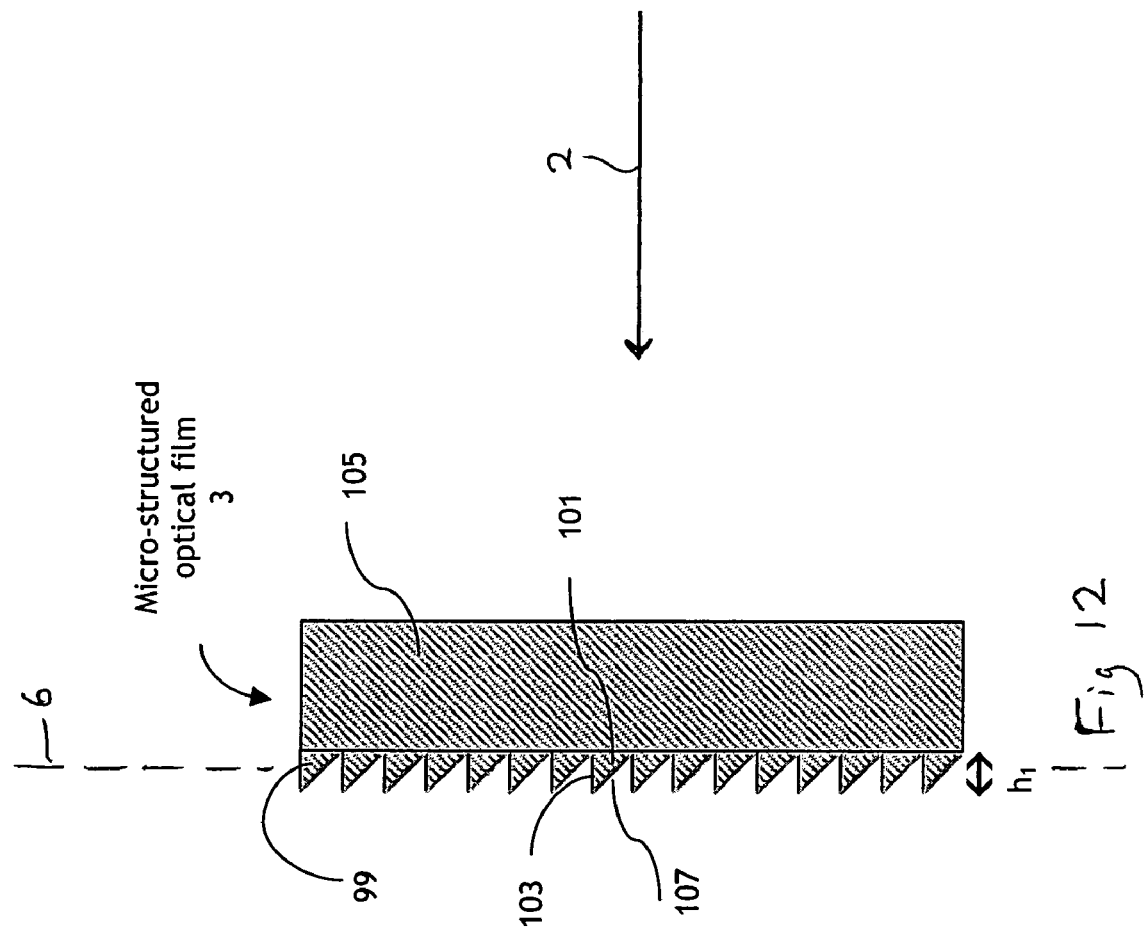
FIG. 12 is a cross-sectional diagram of an optical film constituting a sixth embodiment of the invention.

FIG. 12 illustrates an optical film having a plane input major surface and an output major surface having a surface relief. The surface relief is of the same general type as that on the output surface of the film shown in FIG. 1. Thus, the surface relief comprises prisms or ridges 99 having first and second facets 101 and 103, respectively, with each prism being in contact with each adjacent prisms. The prisms 99 are formed on a base substrate 105 and the first facets 101 are coated with specularly reflective mirror coatings 107 so as to be specularly reflective on both sides.

Figure 13:
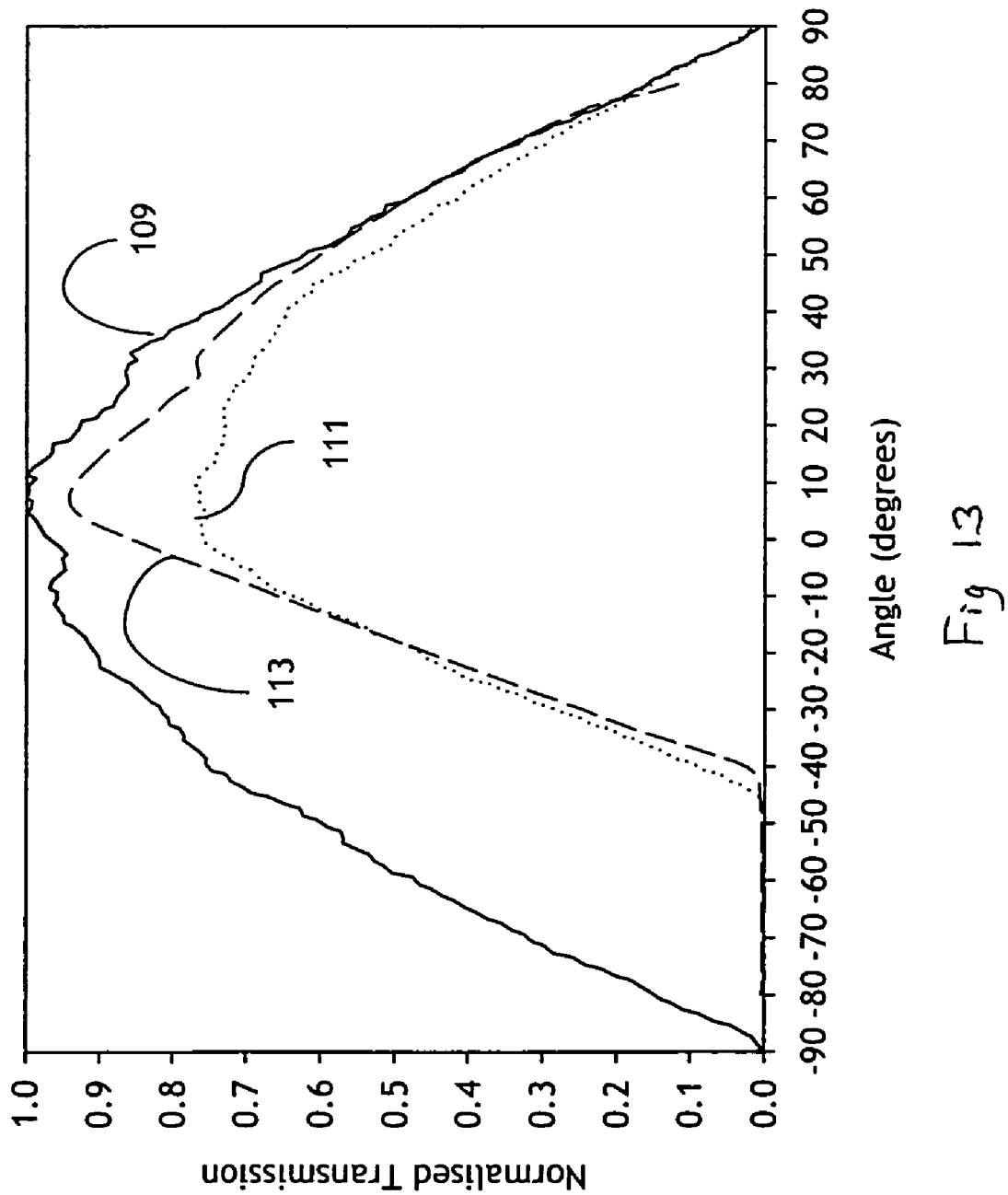
FIG. 13 is a graph of light intensity in arbitrary units against output angle in a vertical plane illustrating the performance of the optical film of FIG. 12.

FIG. 13 illustrates the optical performance for an example of the optical film of FIG. 12 made of an acrylic polymer with a refractive index of approximately 1.49. The height $h_1$ of the prisms 99 is 45 microns and the first and second facets 101 and 103 are oriented at angles of 45° and 90°, respectively, to the plane 6. The curve 109 again shows the normalised luminance against angle for the backlight on its own. The curve 11 illustrates the model optical performance for the film of FIG. 12 in the absence of recycling whereas the curve 113 illustrates the experimental optical performance with recycling.

Both of the curves 111 and 113 illustrate a sharp cut-off in luminance with angle such that little light escapes from the film for angles beyond about 40°.

Figure 14:
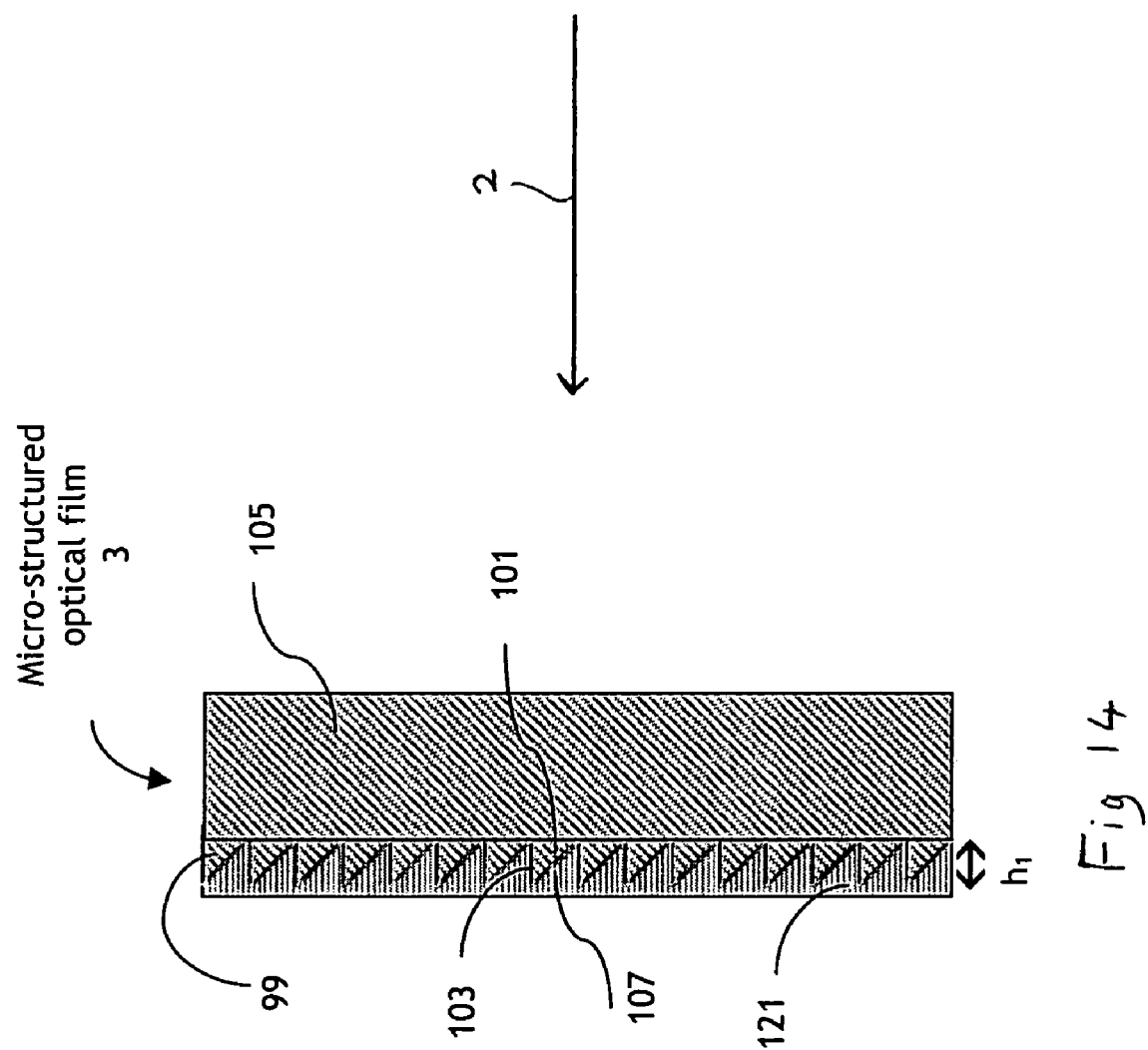
FIG. 14 is a cross-sectional diagram illustrating a modified optical film of the type shown in FIG. 12.

In the example illustrated in FIG. 14, the surface relief on the output major surface of the film 3 is planarised after formation of the surface relief. The surface relief is planarised by means of a planarising layer 121, comprising any suitable transparent material.

Figure 15:
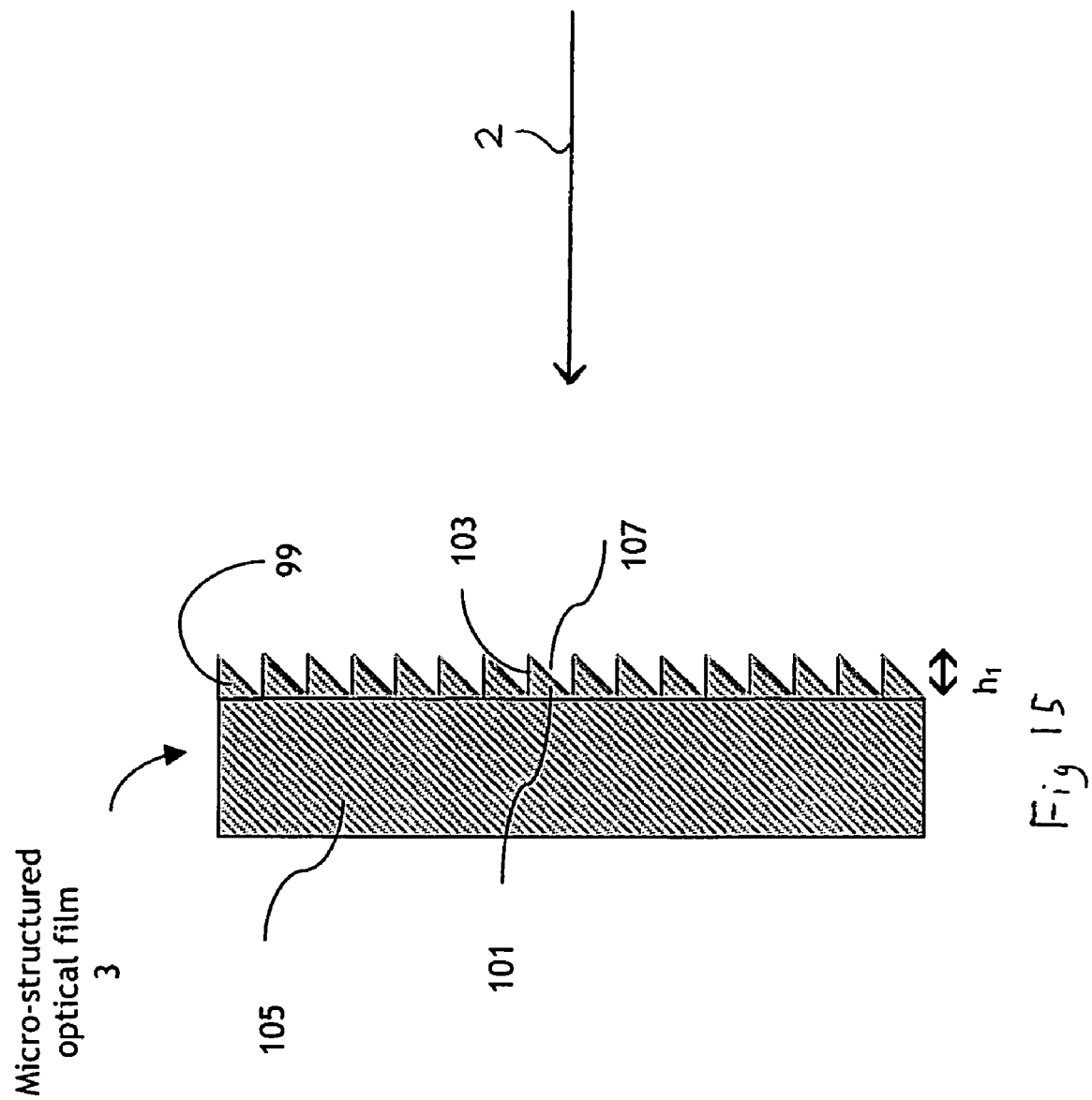
FIG. 15 is a cross-sectional diagram illustrating use of the optical film of FIG. 12 for the opposite direction of light propagation.

As shown in FIG. 15, the optical film 3 of FIG. 12 may be used with the opposite direction of light propagation. In this case, light from the backlight is incident on the major surface carrying the surface relief and exits from the substantially plane major surface of the film 3.

Figure 16:
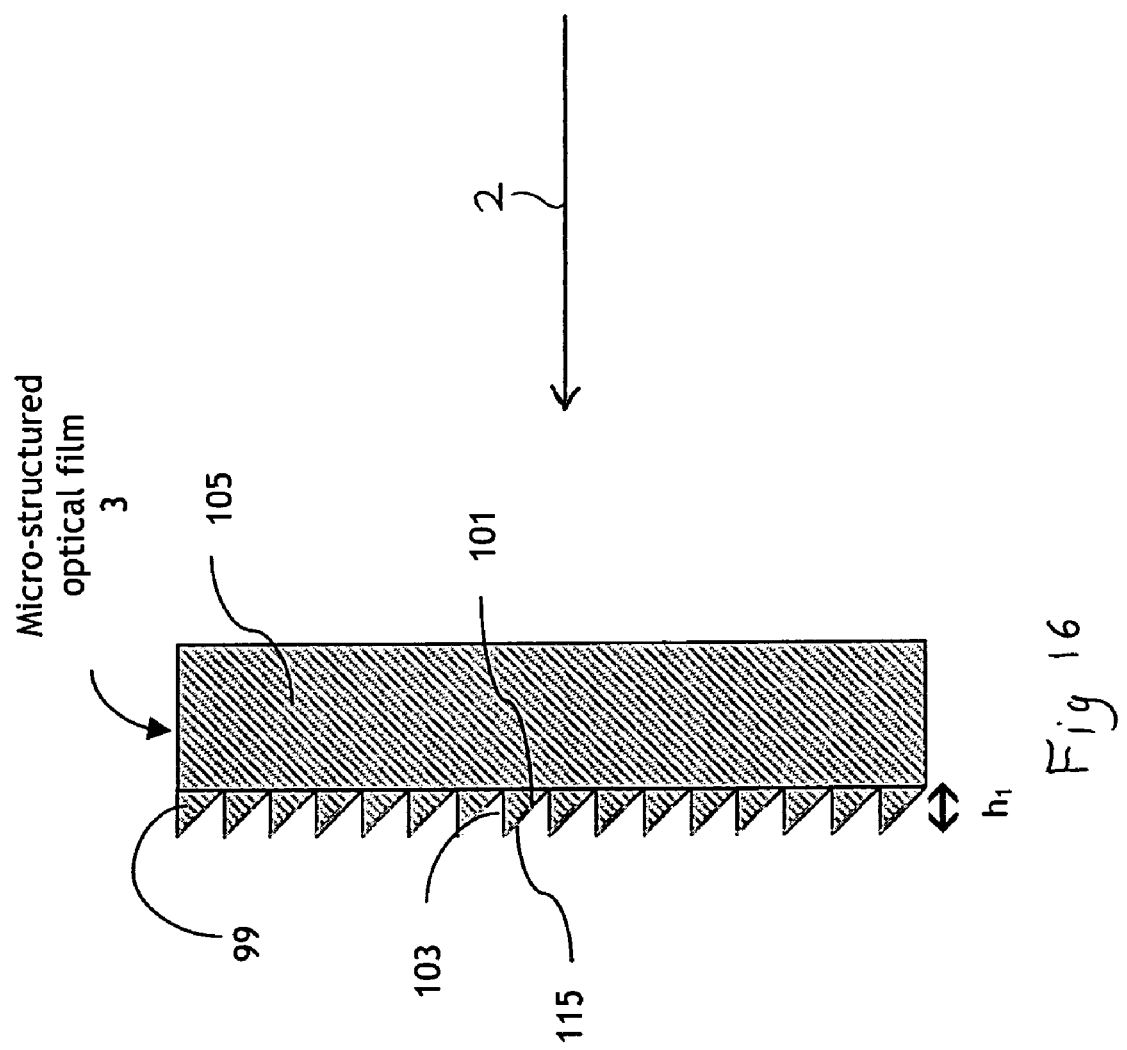
FIG. 16 is a cross-sectional diagram of an optical film of a type similar to that shown in FIG. 12 and constituting a seventh embodiment of the invention.

The optical film 3 shown in FIG. 16 differs from that shown in FIG. 12 in that the facets 101 are only partially coated with a specularly reflective mirror coating 115. The remaining portions of the facets 101 are transmissive so that only a portion, in the form of a strip extending generally horizontally, of each facet 101 is specularly reflective on both sides.

Figure 17:
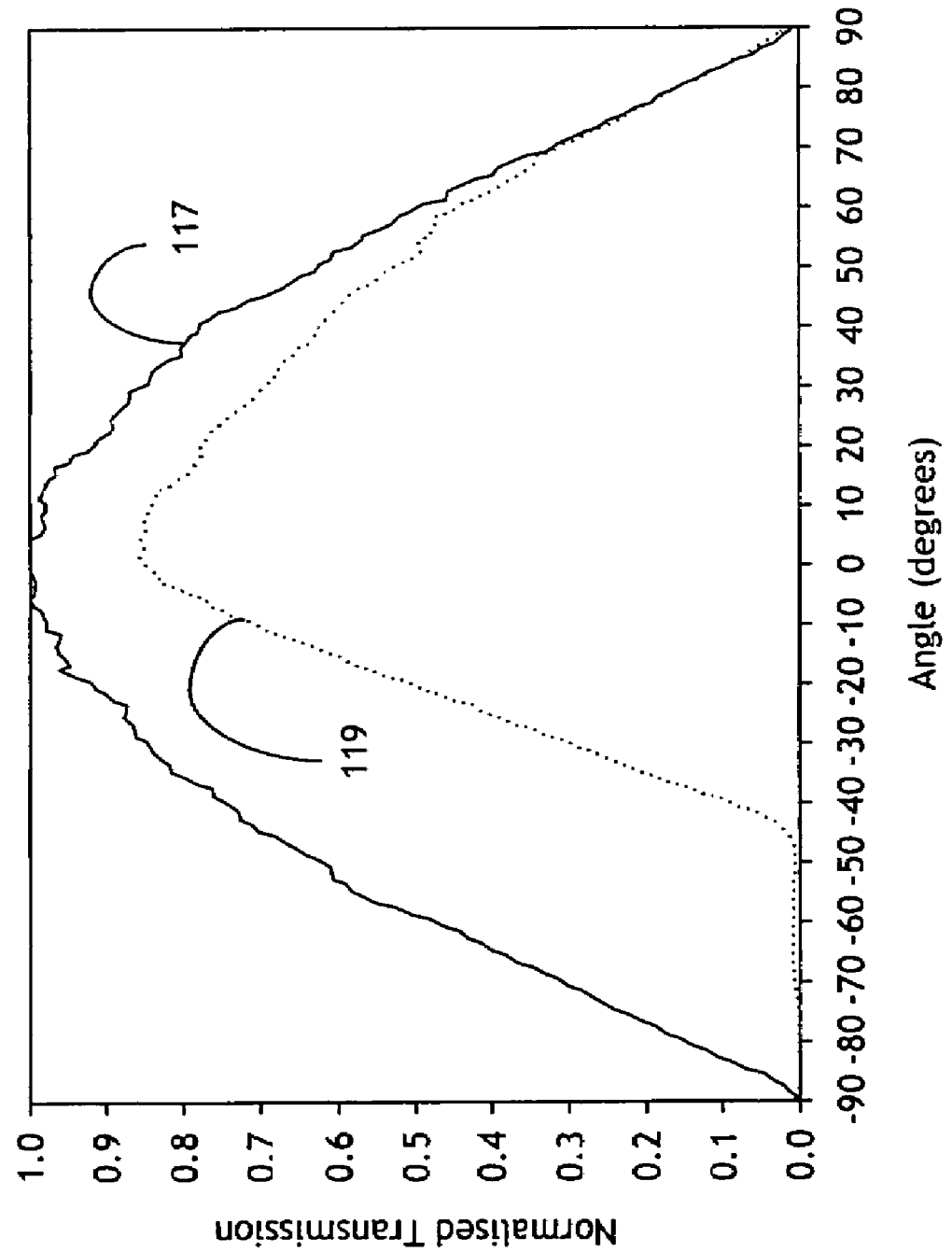
FIG. 17 is a graph of light intensity in arbitrary units against output angle in a vertical plane illustrating the performance of the optical film of FIG. 16.

FIG. 17 is a graph, similar to the previously described graphs, in which the curve 117 represents the optical performance of a backlight and the curve 119 represents the optical performance of the film 3 of FIG. 16. A rapid cut-off in luminance with angle is provided with very little light being emitted for angles beyond about −45°. The curve 119 does not take into account light recycling but it may be expected that, with such recycling, luminance in a desired viewing angular range will be comparable to the backlight without the film 3.

Figure 18B:
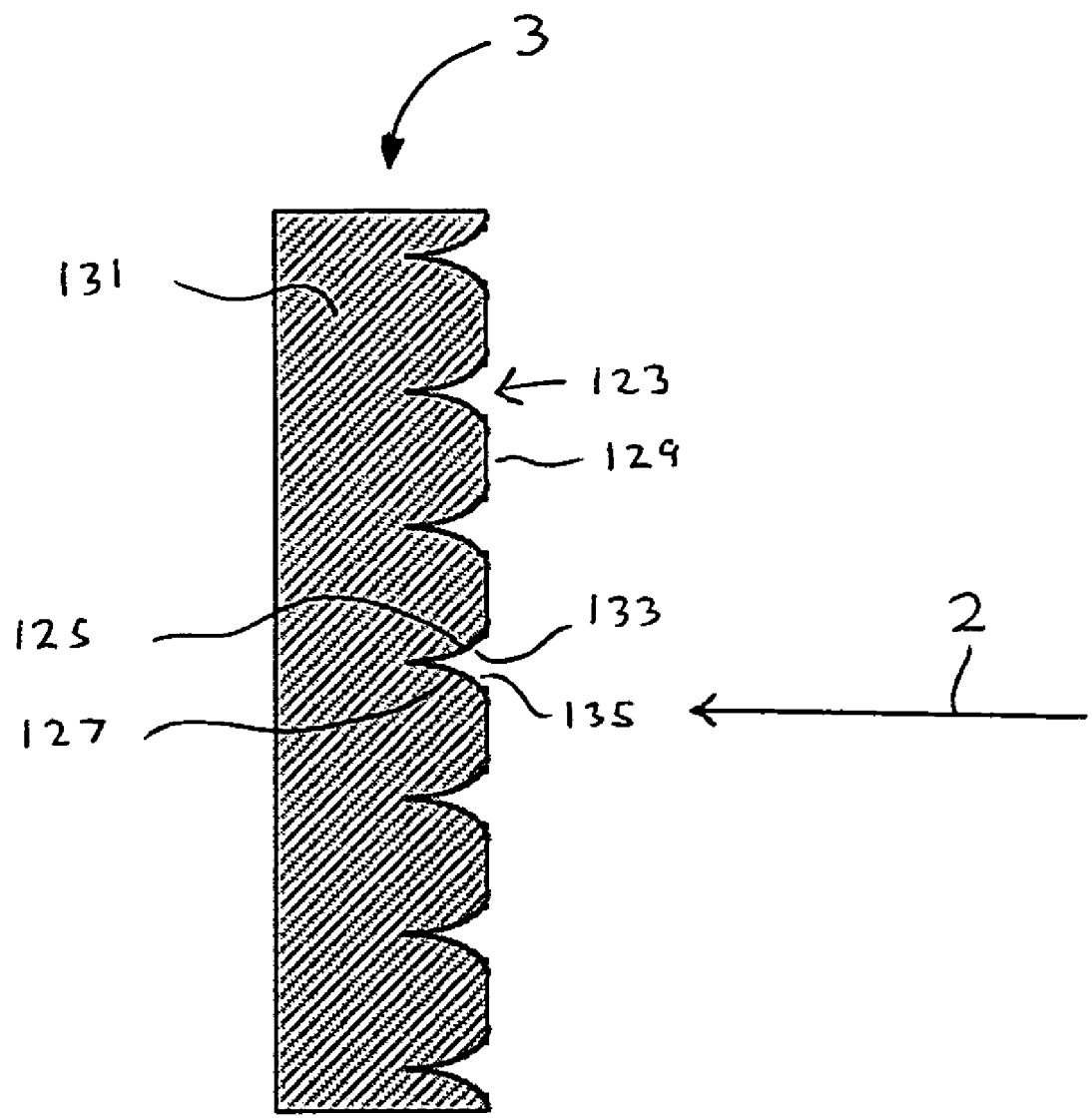

In the optical films described hereinbefore, all of the surfaces and facets are plane. However, this is not essential and FIGS. 18*a* and 18*b* illustrate embodiments which include curved facets. The optical film in FIG. 18*a* comprises a base substrate 131 having a substantially plane major input surface and an output surface with surface relief in the form of a one dimensional array of ridges or prisms 123 separated by gaps 129. Each prism has first and second facets 125 and 127, which are curved. In particular, the facets 125 and 127 are concave, for example comprising generally cylindrical strips. The facets 125 and 127 are coated with a specularly reflective film 133 and 135 so as to be specularly reflective on both sides.

The optical film in FIG. 18*b* differs from that shown in FIG. 18*a* in that the base substrate 131 has a substantially plane major output surface and an input surface with a surface relief in the form of a one dimensional array of grooves 123. Each groove has first and second facets 125 and 127, which are curved. The facets 125 and 127 are convexed, for example comprising generally cylindrical strips. The facets 125 and 127 are coated with a specularly reflective film 133 and 135 so as to be specularly reflective on both sides.

Figure 19:
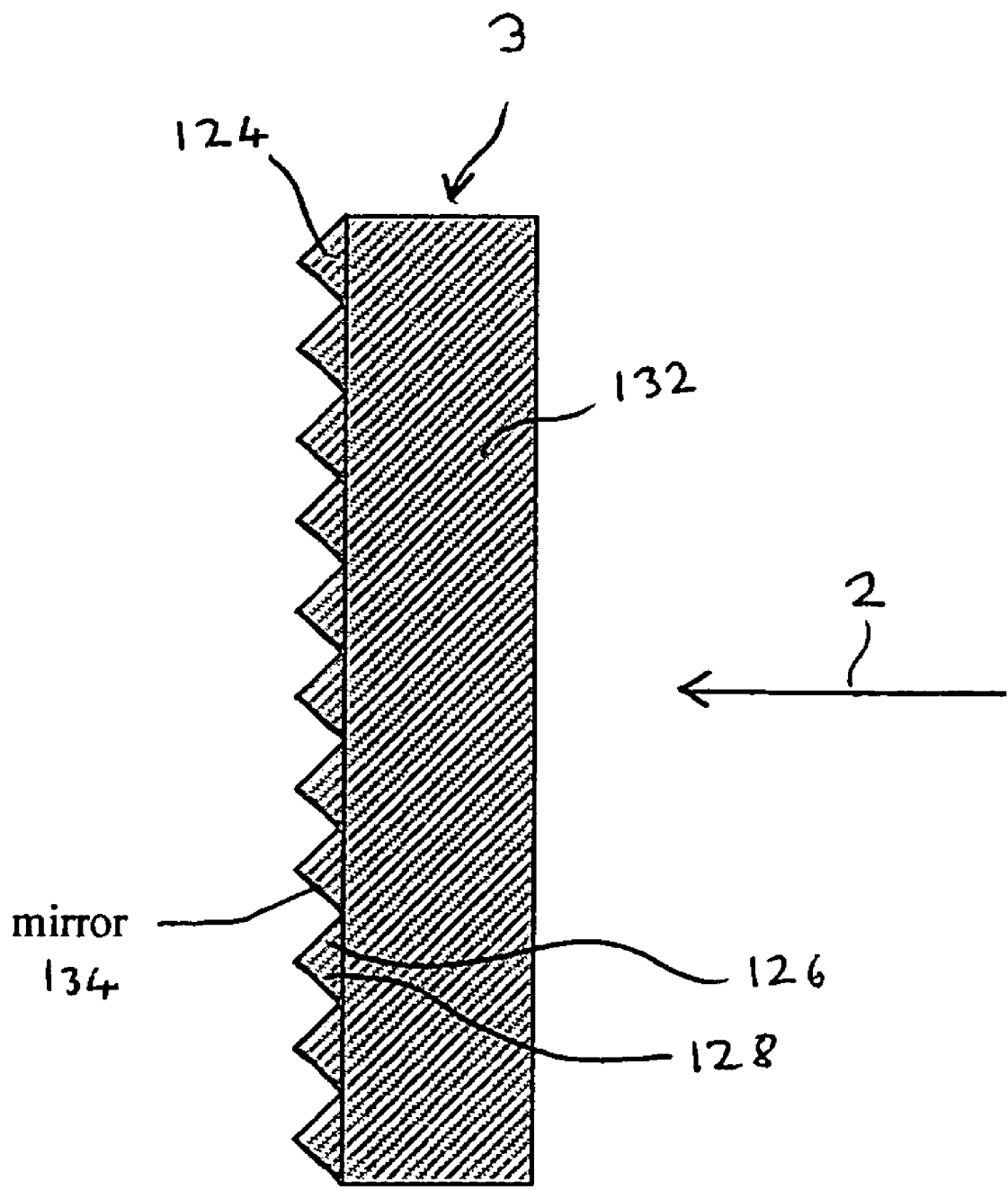
FIG. 19 is a cross-sectional diagram of an optical film constituting a tenth embodiment of the invention.

FIG. 19 illustrates an optical film 3 comprising a base substrate 132 having a plane input major surface and an output surface having a surface relief in the form of a one dimensional array of prisms 124. The prisms 124 are contiguous with each other and have plane facets 126 and 128. The facets 128 are provided with a mirror coating 134 so as to have a surface which is specularly reflective on both sides. The cross-sectional shapes of the prisms 124 comprise right-angled isosceles triangles.

The optical films described hereinbefore provide reduced angular output in one plane without substantially affecting the angular output in the orthogonal plane. In order to control the angular output in two orthogonal planes, a pair of "crossed" optical films may be used as illustrated in FIG. 20*a*. A first optical film 3*a* with a first surface relief 140 is disposed adjacent the backlight 1 and is oriented as illustrated in the preceding figures so as to provide a more restricted angular output range in a vertical plane with a relatively rapid cut off in light output at at least one end of the output angular range. A second optical film 3*b* is provided with a second surface relief 141 comprising a one-dimensional array of prismatic ridges extending vertically so as to provide a restricted angular output range in the horizontal plane. For example, the optical film 3*a* may be arranged to provide a very sharp cut-off at 30° above the horizontal direction whereas the optical film 3*d* may provide a symmetrical cut-off, for example at 45° on either side of the horizontal direction.

Figure 20B:
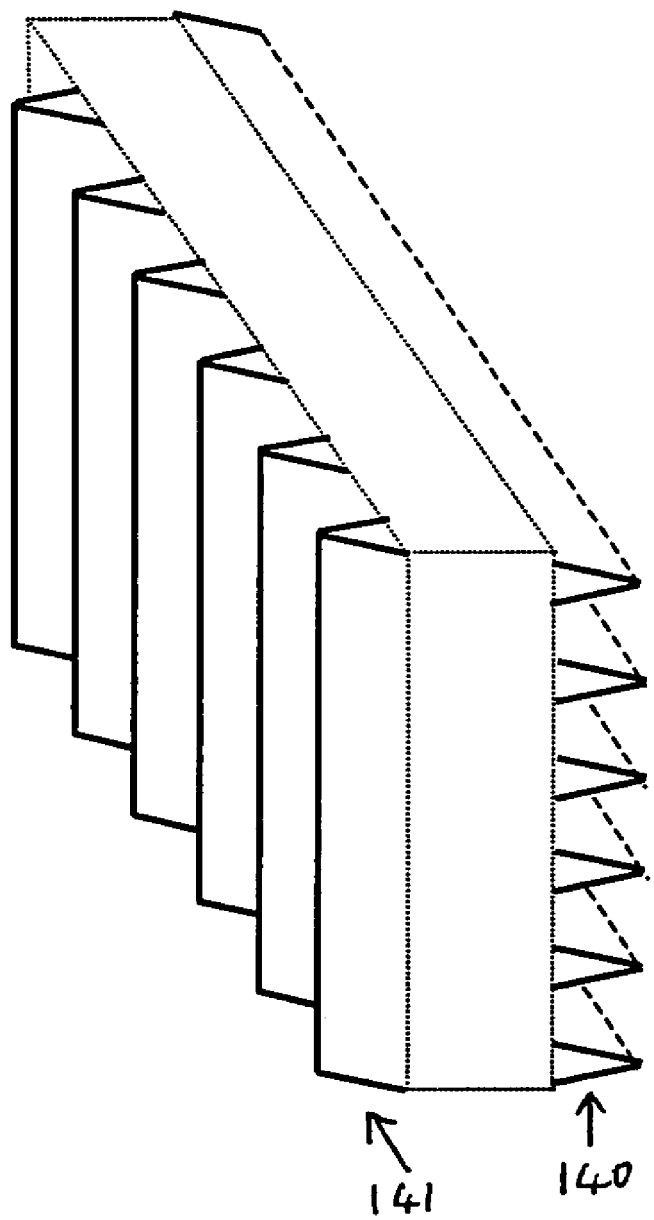
FIG. 20b is a diagrammatic view of an optical film constituting a twelfth embodiment of the invention.

Although the surface reliefs 140 and 141 are shown as being provided on separate optical filings 3*a* and 3*b* in FIG. 20*a*, they could be provided on a single optical film. FIG. 20*b* illustrates a first such arrangement in which opposite major surfaces of the film 3 have the first and second surface reliefs 140 and 141. The reliefs 140, 141 comprise one-dimensional arrays of prismatic ridges with the ridges of the first and second reliefs 140 and 141 extending in different directions, in this example orthogonally with respect to each other.

Figure 21:
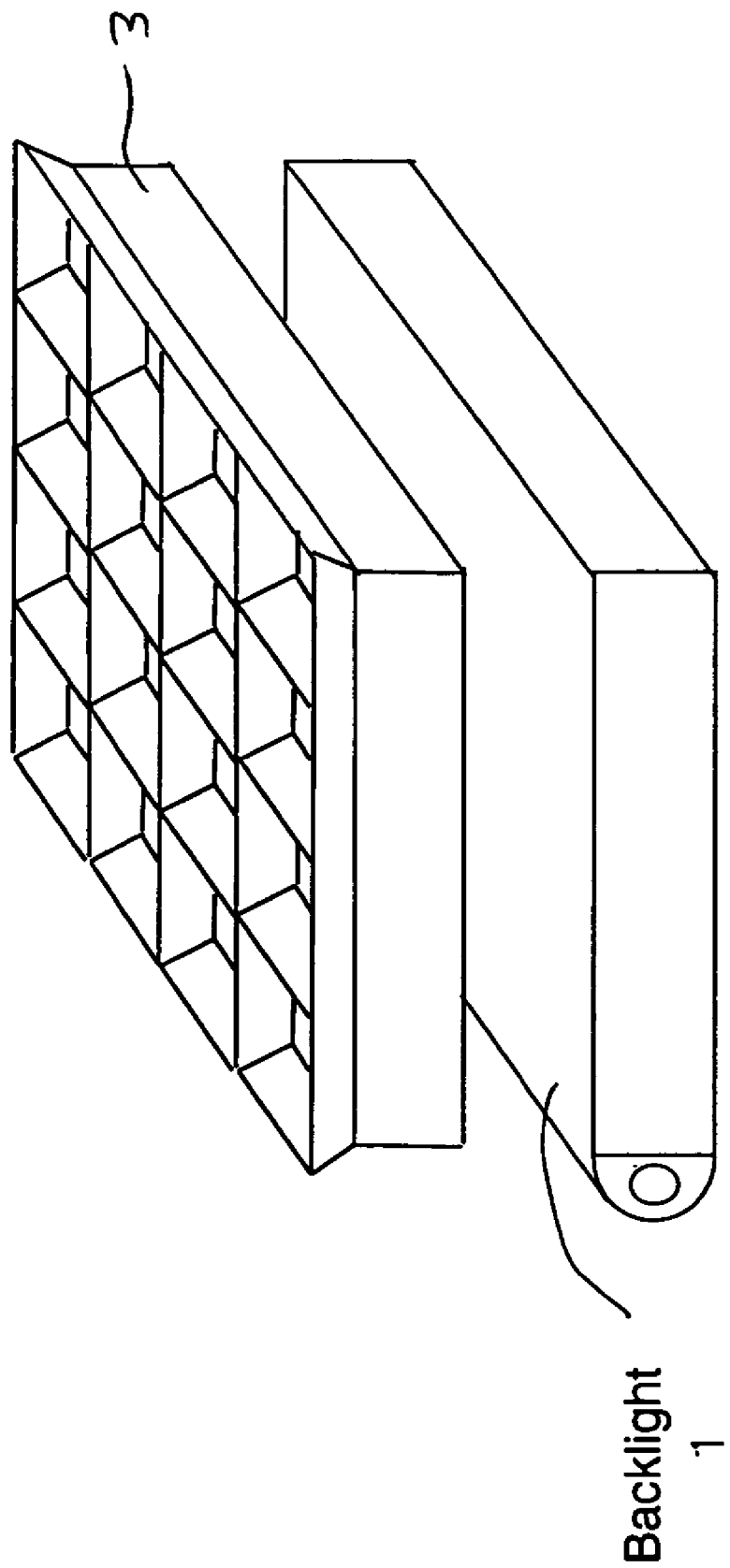
FIG. 21 is a diagrammatic view of an illuminator constituting a thirteenth embodiment of the invention.

FIG. 21 illustrates another arrangement for providing vertical and horizontal output angle control by means of a single optical film 3. In this case, the optical film 3 has a plane input surface and a surface relief on its output surface. The surface relief comprises a two-dimensional or "criss-cross" pattern of ridges. This is equivalent to combining the ridges of the individual films 3*a* and 3*b* shown in FIG. 20*a* into a single surface relief structure. Such an arrangement may provide the same or different light control in the vertical and horizontal planes.

Figure 22:
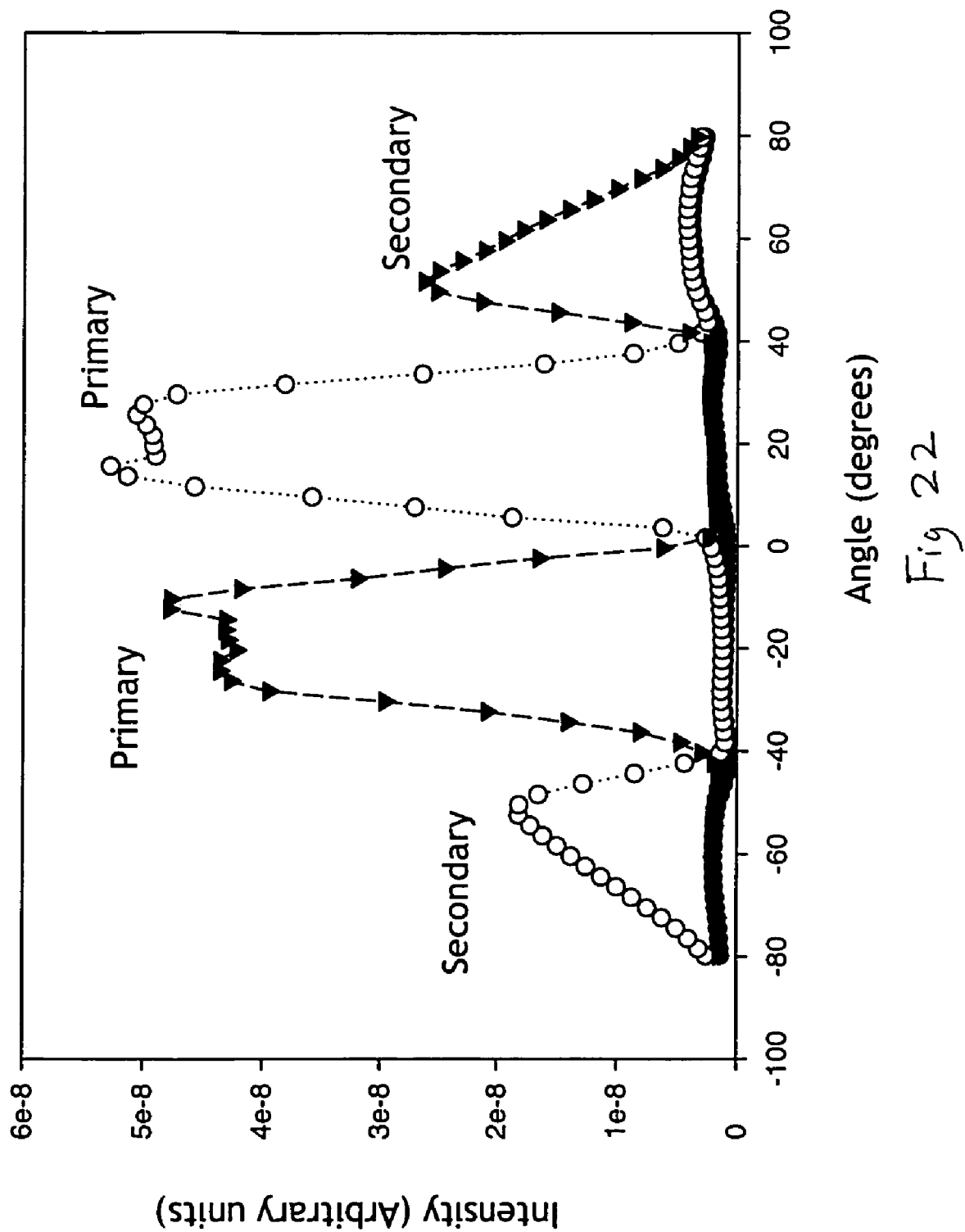
FIG. 22 is a graph of light intensity in arbitrary units against output angle illustrating an application of an optical film according to any of the embodiments of the invention.

Other types of displays are known in which at least one restricted viewing range or viewing window is created. For example, it is known to combine a backlight or a spatial light modulator with a parallax generating element such as a parallax barrier or a lenticular screen. When cooperating with the backlight or spatial light modulator structure, such arrangements create primary viewing windows for viewing of the displayed images and undesirable secondary viewing windows, as illustrated in FIG. 22. By using suitably deigned optical films of the type described herein, it is possible to reduce or eliminate the undesirable secondary windows by substantially cutting off light directed into such windows. Improved performance may therefore be achieved, for example in multiple view displays for displaying independent images to different viewers or for autostereoscopic display for displaying stereoscopically related images.

Various methods may be used for manufacturing optical films of the types described herein. For example, the surface reliefs may be formed by pressing, stamping, embossing or moulding a suitable substrate.

The reflective surfaces may be formed by uniform metal coatings. Such coatings may be formed by deposition, for example by evaporating a suitable metal inside a vacuum chamber or by electroplating. Alternatively, metal layers may be directly transferred onto the substrate when the film is pressed, stamped, embossed or moulded.

The surface relief may subsequently be polished in order to remove metal from unwanted facets. As an alternative, the metal film may be coated with a photoresist, which is selectively exposed so as to pattern the resist. Subsequent etching of the underlying metal layer may then be used to provide the desired pattern in the metal film.

In the case where a uniform metal coating is deposited by evaporating a suitable metal inside a vacuum chamber, the desired reflective coatings may be formed directly. For example, by carefully controlling the position and angle of a substrate relative to a metal source within the vacuum chamber, selected facets may be covered by a metal film whereas other facets remain uncoated.

As an alternative, the reflective surfaces may be provided by multi-layer dielectric reflectors.

Optical films of the type described herein may be used on their own to control illumination or viewing angle or in conjunction with other films. For example, such optical films may be used with brightness enhancing films such as those known as BEF or DBEF available from 3M.

The invention claimed is:

1. An optical film comprising a light-transmissive substrate of a material having a refractive index greater than one, said substrate having first and second major surfaces, one of which has a first surface relief on which is formed a mirror structure, said mirror structure comprising a plurality of transmissive surfaces and a plurality of reflective surfaces each having a specularly reflective layer which are specularly reflective towards said material of said substrate, first groups of said reflective surfaces alternating in at least one direction with second groups of said transmissive surfaces, where each of said first groups comprises at least one said reflective surface and each of said second groups comprises at least one said transmissive surface, all of said reflective surfaces being non-parallel to a first plane in which said first surface relief extends and at least some of said reflective surfaces being non-perpendicular to said first plane, the transmissive surfaces being parallel to the first plane, and reflective surfaces adjacent to and on opposite sides of a transmissive surface being asymmetrical in a second plane perpendicular to said first plane and parallel to the direction in which said first surface relief extends, such that, for light propagating through said film from said first surface to said second surface, light in a first angular input range in said second plane passes through said film without reflection into a first angular output range in said second plane and light in a second angular input range on a first side of said first input range is reflected by said mirror structure so as to exit said second surface in a second angular output range, which is in said second plane and which at least partially overlaps said first output range.

2. A film as claimed in claim 1, in which said first and second input ranges are contiguous with each other.

3. A film as claimed in claim 1, in which said reflective surfaces are such that light in a third angular input range, on a second side of said first input range opposite said first side is reflected by said mirror structure so as to exit said second surface in a third angular output range, which is in said second plane and which at least partially overlaps said first output range.

4. A film as claimed in claim 3, in which said first and third input ranges are contiguous with each other.

5. A film as claimed in claim 1, in which said reflective surfaces substantially occlude light from exiting said second surface outside a desired angular output range.

6. A film as claimed in claim 5, in which said reflective surfaces reflect said occluded light back from said first surface.

7. A film as claimed in claim 6, in which said second surface has said first surface relief and said reflective surfaces reflect said occluded light back through said substrate.

8. A film as claimed in claim 6, in which said first surface has said first surface relief.

9. A film as claimed in claim 8, in which each of said first groups comprises first and second ones of said reflective surfaces defining a groove.

10. A film as claimed in claim 5, in which said first surface has said first surface relief and each of said first groups comprises first and second ones of said reflective surfaces defining a groove.

11. A film as claimed in claim 10, in which each of said grooves is filled with a reflective fill.

12. A film as claimed in claim 11, in which each of said fills has a specularly reflective surface facing away from said substrate.

13. A film as claimed in claim 10, in which each of said grooves is filled with a substantially non-reflective fill.

14. A fill as claimed in claim 13, in which said fills are transmissive.

15. A film as claimed in claim 13, in which each of said fills has formed thereon a specularly reflective layer.

16. A film as claimed in claim 1, in which said first surface relief comprises a one-dimensional array of ridges.

17. A film as claimed in claim 16, in which said ridges are of constant cross-sectional size and shape along their lengths.

18. A film as claimed in claim 16, in which each said ridge comprises one of said transmissive surfaces and first and second of said reflective surfaces tapering towards each other to said transmissive surface, which is parallel to said first plane.

19. A film as claimed in claim 16, in which each said ridge comprises one of said transmissive surfaces and first and second of said reflective surfaces tapering towards each other to said transmissive surface, which is substantially parallel to said first plane.

20. A film as claimed in claim 1, in which said first surface relief comprises a two-dimensional array of ridges.

21. A film as claimed in claim 1, in which said first surface relief is planarised.

22. A film as claimed in claim 1, in which another of said first and second surfaces has a second surface relief.

23. A film as claimed in claim 22, in which said second relief has surfaces, all of which are transmissive.

24. A film as claimed in claim 23, in which said second surface relief is planarised.

25. A film as claimed in claim 1, in which at least some of said reflective and transmissive surfaces are plane surfaces.

26. A film as claimed in claim 1, in which said first and second surfaces extend in substantially parallel planes.

27. An illuminator comprising: a light source having an exit surface; and an optical film disposed adjacent the exit surface and comprising a light-tranmissive substrate of a material having a refractive index greater than one, said substrate having first and second major surfaces, one of which has a first surface relief on which is formed a mirror structure, said mirror structure comprising a plurality of transmissive surfaces and a plurality of reflective surfaces each having a specularly reflective layer which are specularly reflective towards said material of said substrate, first groups of said reflective surfaces alternating in at least one direction with second groups of said transmissive surfaces, where each of said first groups comprises at least one said reflective surface and each of said second groups comprises at least one said transmissive surface, all of said reflective surfaces being non-parallel to a first plane in which said first surface relief extends and at least some of said reflective surfaces being non-perpendicular to said first plane, the transmissive surfaces being parallel to the first plane, and reflective surfaces adjacent to and on opposite sides of a transmissive surface being asymmetrical in a second plane perpendicular to said first plane and parallel to the direction in which said first surface relief extends, such that, for light propagating through said film from said first surface to said second surface, light in a first angular input range in said second plane passes through said film without reflection into a first angular output range in said second plane and light in a second angular input range on a first side of said first input range is reflected by said mirror structure so as to exit said second surface in a second angular output range, which is in said second plane and which at least partially overlaps said first output range.

28. An illuminator as claimed in claim 27, in which said reflective surfaces substantially occlude light from exiting said second surface outside a desired angular output range.

29. An illuminator as claimed in claim 28, in which said reflective surfaces reflect at least part of said occluded light back towards said light source and said light source returns at least some of reflected occluded light to said film.

30. An illuminator as claimed in claim 29, in which said second surface has said first surface relief and said reflective surfaces reflect said occluded light back through said substrate.

31. An illuminator as claimed in claim 29, in which said first surface has said first surface relief.

32. An illuminator as claimed in claim 31, in which each of said first groups comprises first and second ones of said reflective surfaces defining a groove.

33. A film as claimed in claim 28, in which said first surface has said first surface relief and each of said first groups comprises first and second ones of said reflective surfaces defining a groove.

34. An illuminator as claimed in claim 33, in which each of said grooves is filled with a reflective fill.

35. An illuminator as claimed in claim 34, in which each of said fills has a specularly reflective surface facing away from said substrate.

36. A film as claimed in claim 33, in which each of said grooves is filled with a substantially non-reflective fill.

37. A film as claimed in claim 36, in which said fills are transmissive.

38. A film as claimed in claim 36, in which each of said fills has formed thereon a specularly reflective layer.

39. A display comprising a spatial light modulator, a light source having an exit surface, and an optical film comprising a light-transmissive substrate of a material having a refractive index greater than one, said substrate having first and second major surfaces, one of which has a first surface relief on which is formed a mirror structure, said mirror structure comprising a plurality of transmissive surfaces and a plurality of reflective surfaces each having a specularly reflective layer which are specularly reflective towards said material of said substrate, first groups of said reflective surfaces alternating in at least one direction with second groups of said transmissive surfaces, where each of said first groups comprises at least one said reflective surface and each of said second groups comprises at least one said transmissive surface, all of said reflective surfaces being non-parallel to a first plane in which said first surface relief extends and at least some of said reflective surfaces being non-perpendicular to said first plane, the transmissive surfaces being parallel to the first plane, and reflective surfaces adjacent to and on opposite sides of a transmissive surface being asymmetrical in a second plane perpendicular to said first plane and parallel to the direction in which said first surface relief extends, such that, for light propagating through said film from said first surface to said second surface, light in a first angular input range in said second plane passes through said film without reflection into a first angular output range in said second plane and light in a second angular input range on a first side of said first input range is reflected by said mirror structure so as to exit said second surface in a second angular output range, which is in said second plane and which at least partially overlaps said first output range.

40. A display as claimed in claim 39, in which said optical film is disposed between said exit surface and said modulator.

41. A display as claimed in claim 40, in which said reflective surfaces substantially occlude light from exiting said second surface outside a desired angular output range.

42. A display as claimed in claim 41, in which said reflective surfaces reflect at least part of said occluded light back towards said light source and said light source returns at least some of said reflected occluded light to said film.

43. A display as claimed in claim 42, in which said second surface has said first surface relief and said reflective surfaces reflect said occluded light back through said substrate.

44. A display as claimed in claim 42, in which said first surface has said first surface relief.

45. A display as claimed in claim 44, in which each of said first groups comprises first and second ones of said reflective surfaces defining a groove.

46. A display as claimed in claim 41, in which said first surface has said first surface relief and each of said first groups comprises first and second ones of said reflective surfaces defining a groove.

47. A display as claimed in claim 46, in which each of said grooves is filled with reflective fill.

48. A display as claimed in claim 47, in which each of said fills has a specularly reflective surface facing away from said substrate.

49. A display as claimed in claim 46, in which each of said grooves is filled with a substantially non-reflective fill.

50. A display as claimed in claim 49, in which said fills are transmissive.

51. A display as claimed in claim 49, in which each of said fills has formed thereon a specularly reflective layer.

52. A display as claimed in claim 39, in which the specularly reflective layer is a coating.

53. A display as claimed in claim 39, in which the specularly reflective layer is a mirror.

* * * * *